US007664120B2

(12) United States Patent
Hershey

(10) Patent No.: US 7,664,120 B2
(45) Date of Patent: *Feb. 16, 2010

(54) MULTIPLE-TRANSCEIVER DISTRIBUTED DYNAMIC CHANNEL SELECTION IN A COMMUNICATION NETWORK

(75) Inventor: Stephen P. Hershey, Aurora, CO (US)

(73) Assignee: Raytheon Company, Waltham, MA (US)

( * ) Notice: Subject to any disclaimer, the term of this patent is extended or adjusted under 35 U.S.C. 154(b) by 579 days.

This patent is subject to a terminal disclaimer.

(21) Appl. No.: 11/237,990

(22) Filed: Sep. 27, 2005

(65) Prior Publication Data

US 2007/0070918 A1    Mar. 29, 2007

(51) Int. Cl.
 *H04L 12/56* (2006.01)
(52) U.S. Cl. .................. 370/400; 370/411; 370/338; 370/437
(58) Field of Classification Search .......... 370/401, 370/236, 238, 432, 430, 235, 278, 338; 455/41.2–41.3, 455/412
See application file for complete search history.

(56) References Cited

U.S. PATENT DOCUMENTS

| 6,404,756 | B1 | 6/2002 | Whitehill et al. ............ 370/338 |
| 6,640,253 | B2 | 10/2003 | Schaefer ..................... 709/248 |
| 6,901,064 | B2 | 5/2005 | Cain et al. .................. 370/337 |
| 6,904,032 | B2 | 6/2005 | Cain ........................... 370/337 |
| 6,922,395 | B1 | 7/2005 | Elliott et al. ............... 370/241 |
| 7,020,438 | B2 | 3/2006 | Sinivaara et al. |

| 7,414,982 | B2 * | 8/2008 | Hershey et al. ............. 370/252 |

(Continued)

FOREIGN PATENT DOCUMENTS

GB    2 379 358 A    3/2003

(Continued)

OTHER PUBLICATIONS

PCT, Notification of Transmittal of the International Search Report and the Written Opinion of the International Searching Authority, or the Declaration, PCT/US2006/035952, 10 Pages, Date Mailed Feb. 27, 2007.

(Continued)

*Primary Examiner*—Thai D Hoang
(74) *Attorney, Agent, or Firm*—Baker Botts L.L.P.

(57) ABSTRACT

In certain embodiments, a first node among a plurality of distributed nodes capable of forming or reforming a communication network between the nodes, each of the nodes including one or more transceivers, includes a memory for storing values for variables for the first node and includes a plurality of transceivers. The first node is operable to: (1) spontaneously and independent of a centralized controller associated with the network, transmit a probe message for purposes of forming or reforming a network; (2) receive a probe message from a second node for purposes of forming or reforming a network, the probe message including values for variables for the second node; (3) compare the values for the variables for the first node to the values for the variables for the second node within the probe message to determine, independent of a centralized controller associated with the network, whether the first node should set a home channel of one of its transceivers to a new channel; and (4) if so, set the home channel of a determined one of the transceivers of the first node to the new channel.

48 Claims, 5 Drawing Sheets

U.S. PATENT DOCUMENTS

| | | | |
|---|---|---|---|
| 2003/0002456 A1 | 1/2003 | Soomro et al. | 370/328 |
| 2004/0185887 A1 | 9/2004 | Wolman et al. | 455/516 |
| 2004/0218562 A1 | 11/2004 | Orava et al. | 370/329 |
| 2004/0235485 A1* | 11/2004 | Tanaka | 455/447 |
| 2005/0122999 A1* | 6/2005 | Scherzer et al. | 370/480 |
| 2005/0152297 A1* | 7/2005 | Lee | 370/312 |

FOREIGN PATENT DOCUMENTS

| | | |
|---|---|---|
| WO | WO 03/021886 A2 | 3/2003 |
| WO | WO 03/024129 A1 | 3/2003 |
| WO | WO 2005/011203 | 2/2005 |

OTHER PUBLICATIONS

PCT Notification Transmittal of the International Search Report and the Written Opinion of the International Searching Authority, or the Declaration mailed Dec. 10, 2004, re PCT/US2004/018052 filed Jun. 3, 2004 (17 pages).

Black, et al., *Dynamic Frequency Selection (DFS) in an Independent BSS (IBSS)*, IEEE 802.11-01/532r0 (9 pages), Nov. 1, 2001.

IEEE: Draft supplement to IEEE 802.11h Standard D3.3: *Spectrum and Transmit Power Management Extensions in the 5GHz Band in Europe* (89 pages), Feb. 2003.

U.S. Patent and Trademark Office, Office Action for U.S. Appl. No. 10/603,240, filed Jun. 24, 2003, Stephen P. Hershey, 9 pages, Date Mailed Jun. 26, 2007.

Stephen P. Hershey, Response Pursuant to 37 C.F.R. § 1.111 responding to the Jun. 26, 2007 Office Action for U.S. Appl. No. 10/603,240, 28 pages, Date mailed Sep. 25, 2007.

U.S. Patent and Trademark Office, final Office Action for U.S. Appl. No. 10/603,240, filed Jun. 24, 2003, Stephen P. Hershey, 7 pages, Date Mailed Oct. 18, 2007.

Stephen P. Hershey, Response Pursuant to 37 C.F.R. § 1.116 responding to the Oct. 18, 2007 final Office Action for U.S. Appl. No. 10/603,240, 25 pages, Date Mailed Dec. 18, 2007.

U.S. Patent and Trademark Office, Supplemental Notice of Allowability for U.S. Appl. No. 10/603,240, filed Jun. 24, 2003, Stephen P. Hershey, 6 pages, Date Mailed Jan. 30, 2008.

U.S. Patent and Trademark Office, Notice of Allowance and Fee(s) Due for U.S. Appl. No. 10/603,240, filed Jun. 24, 2003, Stephen P. Hershey, pp. 1 of 3 and 3 of 3, Date Mailed Apr. 14, 2008.

Stephen P. Hershey, Response to Reasons for Allowance responding to the Apr. 14, 2008 Notice of Allowance and Issue Fee(s) Due for U.S. Appl. No. 10/603,240, 2 pages, Date Mailed Jul. 14, 2008.

* cited by examiner ated by the Defense Advanced Research Projects
MULTIPLE-TRANSCEIVER DISTRIBUTED DYNAMIC CHANNEL SELECTION IN A COMMUNICATION NETWORK

GOVERNMENT FUNDING

The U.S. Government may have certain rights in this invention as provided for by the terms of Grant No. F30602-03-C-0079 awarded by the Defense Advanced Research Projects Agency (DARPA).

TECHNICAL FIELD OF THE INVENTION

This invention relates generally to the field of communications and more particularly to multi-transceiver distributed dynamic channel selection in a communication network.

BACKGROUND

Dynamic channel selection (DCS) generally allows nodes within a node group to automatically, without pre-existing knowledge of the channel initially occupied by each node in the node group, select a channel on which to initially form a network or select a new channel on which to reform a network when desirable (e.g., when the current channel becomes unusable). Certain implementations of DCS include a central controller within a DCS network that decides the channels on which nodes within a node group should initially form a network. Additionally, the central controller may decide when the network should transition to a new channel and then manage the channel transitions of other nodes. For example, the IEEE 802.11h working group is producing a specification that adds DCS capabilities to the IEEE 802.11a specification. As another example, the ETSI Broadband Radio Access Networks (BRAN) HIPERLAN/2 specification also includes DCS capabilities. Both of these approaches utilize a node within the network that is given special authority for deciding when the network should select a new channel based on the operating conditions on the current channel.

SUMMARY OF THE INVENTION

According to the present invention, certain disadvantages and problems associated with previous dynamic channel selection techniques may be reduced or eliminated.

In certain embodiments, a first node among a plurality of distributed nodes capable of forming or reforming a communication network between the nodes, each of the nodes including one or more transceivers, includes a memory for storing values for variables for the first node and includes a plurality of transceivers. The first node is operable to: (1) spontaneously and independent of a centralized controller associated with the network, transmit a probe message for purposes of forming or reforming a network; (2) receive a probe message from a second node for purposes of forming or reforming a network, the probe message including values for variables for the second node; (3) compare the values for the variables for the first node to the values for the variables for the second node within the probe message to determine, independent of a centralized controller associated with the network, whether the first node should set a home channel of one of its transceivers to a new channel; and (4) if so, set the home channel of a determined one of the transceivers of the first node to the new channel.

Particular embodiments of the present invention may provide one or more technical advantages. For example, in certain embodiments, the nodes within a node group may automatically, without pre-existing knowledge of the channel initially occupied by each node and without the use of a centralized controller (e.g., a centralized controller node), select a new set of channels on which to reform the network when required or desirable (e.g., a current channel within the current set becomes unusable). This ability may allow nodes in a network to form or reform a network in a more agile manner than other solutions that use a centralized controller to form or reform a network. In certain embodiments, the present invention may apply a distributed approach to DCS such that there is no central controller (e.g., a central controller node) that decides when a network should transition to a new set of channels and then manages the channel transitions of other nodes. Instead, each node within a network may individually decide when to change the channel set based on its local sensing of channel conditions, control message exchanges with other nodes, and any other suitable information. Each node, after changing its channel set, may attract its neighboring nodes on its previous channel set to its new channel set, if appropriate to ensure that each node in the node group has at least one shared channel with each of its neighboring nodes. These operations may be referred to as distributed dynamic channel selection (DDCS).

In certain embodiments, the present invention allows a group of wireless multiple-transceiver nodes with no pre-existing knowledge of each other to negotiate one or more channels for data transfer. The present invention may enable a group of nodes to attempt to maximize connectivity within the group such that each node in the node group has at least one channel in common with each of its "one-hop" (link-layer) neighbors. In certain embodiments, the DDCS protocol provided by the present invention allows nodes within a network such as an ad-hoc network to establish link-layer connectivity to all of their neighboring nodes and to maintain this connectivity despite dynamic changes in node topology and the appearance or disappearance of primary users or interference sources.

In certain embodiments, the present invention is capable of working with nodes that have only a single transceiver, as well as nodes that have multiple transceivers. This may allow scaled or incremental deployment of nodes, multiple-transceiver nodes for example. In certain embodiments, the present invention allows nodes to establish at least one shared channel with neighboring nodes (i.e., converge) relatively quickly. For example, the present invention may allow nodes to converge relatively quickly compared to a protocol that only provides for the convergence of nodes with single transceivers. As a particular example, nodes within a node group may be converged on a network even if each node does not share the same home channel as all other nodes in the network.

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Figure 1:
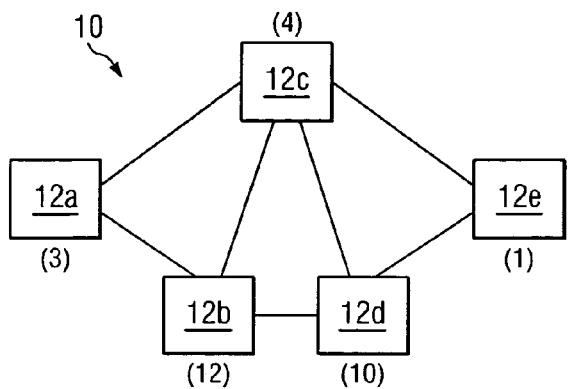
FIG. 1 illustrates an example distributed dynamic channel selection (DDCS) node group of DDCS nodes, prior to convergence, in which each node includes a single transceiver.

FIG. 1 illustrates an example distributed dynamic channel selection (DDCS) node group 10 of DDCS nodes 12, prior to convergence, in which each node 12 includes a single transceiver. In certain embodiments, a node 12 includes a channel-agile mobile terminal within a wireless ad-hoc network. A node group 10 may include a set of nodes 12 that need to or that a user desires to communicate.

In embodiments in which all nodes 12 of a node group 10 include a single transceiver, a network may include a set of nodes 12 within a node group 10 that are able to communicate via one or more link-level hops over a single, shared channel. In certain embodiments, the network includes one or more wireless ad-hoc networks, although the present invention contemplates the network including any suitable types of networks such as one or more local area networks (LANs), metropolitan area networks (MANs), wide area networks (WANs), a global computer network such as the Internet, or any other wireline, optical, wireless, or other links. The network may include a military network, a commercial network, a combination of military and commercial networks, or any other suitable network.

A transceiver may include one or more components within a node 12 for supporting data transfer over a channel. A transceiver may include any suitable combination of hardware, firmware, and software. In certain embodiments, each transceiver associated with a node 12 is assigned a number, from 1 to N for example. This assigned number may be referred to as a "transceiver number" and may be fixed. Throughout this description, a particular transceiver may be referenced with a pound sign (#) in front of the transceiver number.

Throughout this description, a particular format will be used for indicating the number of transceivers within a node and the channel that has been selected by each of those transceivers. For example, adjacent to node 12a appears the number "3" in parenthesis. This means that node 12a includes a single transceiver (i.e., because a single number appears within the parenthesis) and that the single transceiver has selected channel three as its home channel. In certain embodiments, a channel refers to the radio frequency (RF) resources used to support the transfer of upper layer messages. An RF spectrum may be channelized using, for example, time, frequency, code, space, or any other suitable parameter or combination of parameters.

In particular, FIG. 1 illustrates five nodes 12a-12e prior to convergence onto a suitable channel such that each node is able to exchange data with each of its neighboring nodes 12. Each node 12 has selected a different home channel than its neighbors. For example, as shown in parenthesis adjacent to each node 12, the single transceiver of node 12a has selected channel three, the single transceiver of node 12b has selected channel twelve, the single transceiver of node 12c has selected channel four, the single transceiver of node 12d has selected channel ten, and the single transceiver of node 12e has selected channel one. This situation could arise, for example, if nodes 12 power-on simultaneously and randomly select an initial home channel. It should be understood that although in this example each node 12 has selected a different channel, the present invention contemplates two or more nodes selecting the same channel, after power-on for example. In certain embodiments, because each node 12 has selected a different home channel than its neighboring nodes 12, it cannot communicate with its neighboring nodes 12.

DCS generally allows nodes 12 within a node group 10 to automatically, without pre-existing knowledge of the channel initially occupied by each node's transceivers, select a new channel for a transceiver on which to reform the network or sub-network when required or desirable (e.g., a channel becomes unusable or after power-on, if appropriate). In general, DDCS applies a distributed approach to DCS such that there is no central controller (e.g., a central controller node) that decides when nodes 12 within a network should transition to new channels and then manages the channel transitions of nodes 12. Instead, each DDCS node 12 within a network individually decides when to change one or more of its channels based on its local sensing of channel conditions, DDCS control message exchanges with other nodes 12, and any other suitable information. Each node 12, after changing its channel set, may attract its peer nodes 12 on its previous channel set to its new channel set if appropriate.

Figure 2:
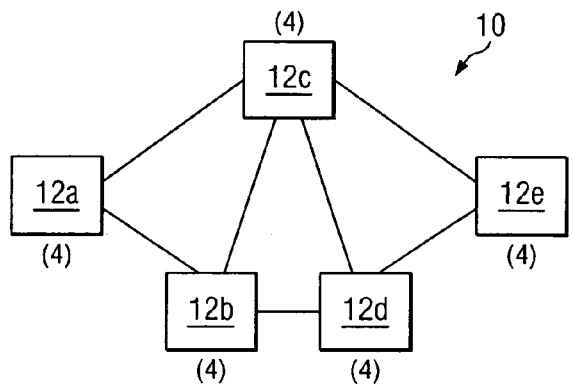
FIG. 2 illustrates the example node group of FIG. 1 after the nodes of the node group have converged.

FIG. 2 illustrates the example node group 10 of FIG. 1 after the nodes 12 of node group 10 have converged. Nodes 12 in node group 10 have cooperatively selected channel four as their home channels, and each node 12 has connectivity with all of its neighbors. Nodes 12 within node group 10 are fully connected in that any node 12 can directly communicate with any other neighboring node 12 within node group 10, and any node 12 can communicate with any other node 12 within node group 10, neighboring or not, by routing a message via intermediate nodes 12 when appropriate. In certain embodiments, the DDCS protocol automatically consolidates multiple independent DDCS networks onto a single channel.

In certain embodiments, certain nodes 12 may have direct link-level connectivity with one another while other nodes 12 may not. For example, node 12a and node 12c have direct link-level connectivity with each other while node 12*a* and node 12*e* have indirect connectivity by routing network layer messages via node 12*c* or via nodes 12*b* and either node 12*c* or node 12*d*.

A DDCS node 12 may periodically probe, listen to, or otherwise use available channels to determine whether it should change channels. With respect to probing, a probing node 12 is a node 12 that is transmitting a probe message, and a receiving node 12 is a node 12 that is receiving a probe message. A primary user is a user with super-ordinate right to use a particular channel, and a secondary user is a user with subordinate right to the use of a channel. In certain embodiments, when a primary user begins operation on a channel, secondary users within range must vacate the channel. In certain embodiments, DDCS may be implemented as a protocol that may be integrated into existing and new protocol stacks to enable DDCS.

Figure 3:
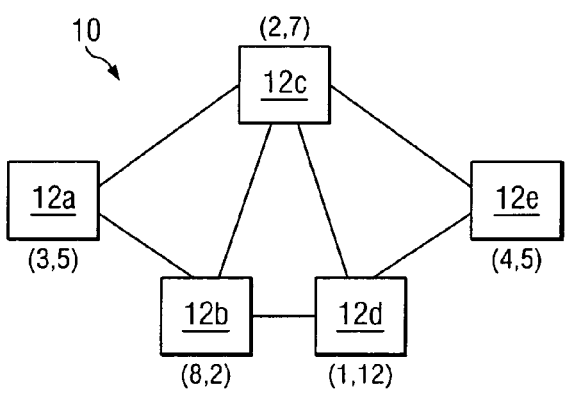
FIG. 3 illustrates an example DDCS node group of DDCS nodes, prior to convergence, in which each node includes two transceivers.

FIG. 3 illustrates an example DDCS node group 10 of DDCS nodes 12, prior to convergence, in which each node 12 includes two transceivers. As described above with reference to FIG. 1, in embodiments in which all nodes 12 of a node group 10 include a single transceiver, a network may include a set of nodes 12 within a node group 10 that are able to communicate via one or more link-level hops over a single, shared channel. In embodiments in which one or more nodes 12 include multiple transceivers, a network may include a set of nodes 12 within a node group 10 that are able to communicate via one or more link-level hops over a sequence of different channels. For example, a network may include a set of nodes 12 within a node group 10 in which each node 12 can communicate with each of its neighboring nodes 12. Thus, in certain embodiments, a network may be formed even though all nodes 12 in the network do not share a single channel in common. This concept is described in more detail below.

As described above, in certain embodiments, a network may include one or more wireless ad-hoc networks, although the present invention contemplates the network including any suitable types of networks such as one or more local area networks (LANs), metropolitan area networks (MANs), wide area networks (WANs), a global computer network such as the Internet, or any other wireline, optical, wireless, or other links. The network may include a military network, a commercial network, a combination of military and commercial networks, or any other suitable network.

In particular, FIG. 3 illustrates five nodes 12*a*-12*e* prior to convergence onto one or more suitable channels such that each node 12 has link-layer connectivity with each of its neighboring nodes 12. In this example, each node 12 has two transceivers and has selected different corresponding home channels than its neighbors. In other words, the corresponding transceivers in neighboring nodes 12 have selected different home channels. At this point, it may be useful to define certain terminology used throughout this description. A home channel is a logical channel by which a node 12 sends data plane messages (e.g. application data) to neighboring nodes 12. A home channel may also carry control and management plane messages between two nodes 12, but the present invention is not so limited. A particular home channel may map directly onto a unique physical channel or may share a physical channel with other home channels. Each node 12 assigns a fixed number to each of its transceivers. Corresponding transceivers refer to transceivers in different nodes 12 that have the same transceiver number. In certain embodiments, link-layer connectivity between two nodes 12 may be established using transceivers with the same number (i.e., corresponding transceivers). In certain embodiments, negotiations between two nodes 12 regarding home channel selection are performed by comparing the states of the corresponding transceivers of the two nodes 12. Two nodes 12 have link-layer connectivity if they share at least one transceiver (i.e., have corresponding transceivers with the same home channel).

In this example, node 12*a* has two transceivers, #1 and #2 (e.g., as indicated by the two numbers, separated by a comma, in the parenthesis adjacent to node 12*a*), which have selected channels three and five, respectively, as their home channels (e.g., as indicated by the values of the two numbers in the parenthesis adjacent to node 12*a*). Node 12*b*, a neighbor of node 12*a*, has two transceivers, #1 and #2, which have selected channels eight and two, respectively, as their home channels. Nodes 12*a* and 12*b* have two corresponding transceivers, transceivers #1 and transceivers #2. However, because neither of the corresponding transceivers has selected the same home channel, nodes 12*a* and 12*b* do not share a transceiver and thus do not have link-layer connectivity. For example, first corresponding transceivers of nodes 12*a* and 12*b* (i.e., transceiver #1 of node 12*a* and transceiver #1 of node 12*b*) have each selected different home channels (e.g., channels three and eight, respectively) and thus, do not have link-layer connectivity. As another example, second corresponding transceivers of nodes 12*a* and 12*b* (i.e., transceiver #2 of node 12*a* and transceiver #2 of node 12*b*) have each selected different home channels (e.g., channels five and two, respectively) and thus do not have link-layer connectivity.

Similar relationships exist for each of the other sets of neighboring nodes. For example, in addition to lacking a shared transceiver with node 12*b*, node 12*a* does not share a transceiver with node 12*c*, its other neighboring node. As another example, node 12*b* does not share a transceiver with any of its neighbors (i.e., nodes 12*a*, 12*c*, and 12*d*). As another example, node 12*c* does not share a transceiver with any of its neighbors (i.e., nodes 12*a*, 12*b*, 12*d*, and 12*e*). As another example, node 12*d* does not share a transceiver with any of its neighbors (i.e., nodes 12*b*, 12*c*, and 12*e*). As another example, node 12*e* does not share a transceiver with any of its neighbors (i.e., nodes 12*c* and 12*d*).

Although nodes 12*b* and 12*c* each include a transceiver that has selected channel two (i.e., transceiver #2 of node 12*b* and transceiver #1 of node 12*c*), in certain embodiments, nodes 12*b* and 12*c*, still do not have link-layer connectivity because no corresponding transceiver in each of these nodes 12 has selected the same channel (i.e., transceiver #1 of node 12*b* has selected a different home channel than transceiver #1 of node 12*c*, and transceiver #2 of node 12*b* has selected a different home channel than transceiver #2 of node 12*c*). Additionally, although transceivers #2 of nodes 12*a* and 12*e* have both selected channel five as their respective home channels, in certain embodiments, nodes 12*a* and 12*e* do not have link-layer connectivity because they are not neighboring nodes 12.

In certain embodiments, because no corresponding transceiver in any of neighboring nodes 12 has selected the same home channel, none of the neighboring nodes 12 in node group 10 have link-layer connectivity. This situation could arise, for example, if nodes 12 power-on simultaneously and randomly select initial home channels. In certain embodiments, because each node 12 has selected a different home channel than its neighboring nodes 12, it does not have link-layer connectivity with its neighboring nodes 12.

As described with reference to FIG. 1, DCS generally allows nodes 12 within a node group 10 to automatically, without pre-existing knowledge of the channel initially occupied by each node's transceiver, select a new channel for a transceiver when required or desirable (e.g., the current channel becomes unusable or after power-on, if appropriate). In general, DDCS applies a distributed approach to DCS such that there is no central controller (e.g., a central controller node) that decides when a node should transition a transceiver to a new channel and then manages the channel transitions of neighboring nodes 12 to reestablish link-layer connectivity with the node. Instead, each DDCS node 12 within a network individually decides when to change transceiver channels based on its local sensing of channel conditions, DDCS control message exchanges with other nodes 12, and any other suitable information. Each node 12, after changing transceiver channels, may attract its peer nodes 12 on its previous channel set to its new channel set if appropriate.

Figure 4:
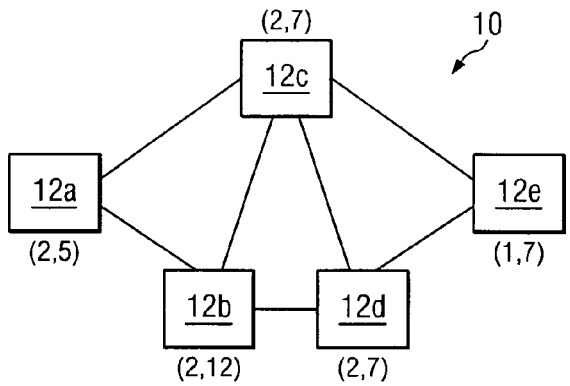
FIG. 4 illustrates the example DDCS node group of FIG. 3 after the nodes of the node group have converged.

FIG. 4 illustrates the example DDCS node group 10 of FIG. 3 after the nodes 12 of node group 10 have converged. For example, the nodes 12 of node group 10 may have converged in such a manner that each node 12 in node group 10 shares at least one channel (i.e., has a shared transceiver) with each of its neighboring nodes 12. Therefore, each node 12 has link-layer connectivity with all of its neighbors, and nodes 12 of node group 10 form a network of nodes 12. Nodes 12 within node group 10 are fully connected in that any node 12 within node group 10 can communicate with any other node 12 within node group 10 either directly or indirectly via one or more intermediate nodes.

In the example illustrated in FIG. 4, node 12a has two transceivers, #1 and #2, which have selected channels two and five, respectively, as their home channels. Node 12b, a neighbor of node 12a, has two transceivers, #1 and #2, which have selected channels two and twelve, respectively, as their home channels. As described above with reference to FIG. 3, nodes 12a and 12b have two corresponding transceivers, transceivers #1 and transceivers #2. Transceiver #1 of node 12a and its corresponding transceiver #1 of node 12b have both selected channel two as their respective home channels. Because at least one corresponding transceiver of nodes 12a and 12b (i.e., transceiver #1 of node 12a and transceiver #1 of node 12b) have each selected the same home channel (i.e., channel two), nodes 12a and 12b have link-layer connectivity with each other using transceivers #1. As another example, node 12c, a neighbor of node 12a, has two transceivers, #1 and #2, which have selected channels two and seven, respectively, as their home channels. Nodes 12a and node 12c have two corresponding transceivers, transceivers #1 and transceivers #2. Transceiver #1 of node 12a and its corresponding transceiver #1 of node 12c have both selected channel two as their respective home channels. Because at least one corresponding transceiver of nodes 12a and 12c (i.e., transceiver #1 of node 12a and transceiver #1 of node 12c) have each selected the same home channel (i.e., channel two), nodes 12a and 12c have link-layer connectivity with each other using transceivers #1.

As another example, node 12d, a neighbor of node 12c, has two transceivers, #1 and #2, which have selected channels two and seven, respectively, as their home channels. Nodes 12c and node 12d have two corresponding transceivers, transceivers #1 and transceivers #2. Transceiver #1 of node 12c and its corresponding transceiver #1 of node 12c have both selected channel two as their respective home channels. Additionally, transceiver #2 of node 12d and its corresponding transceiver #2 of node 12c have both selected channel seven as their respective home channels. In this example, both corresponding transceivers of nodes 12c and 12d (i.e., transceivers #1 and #2 of node 12c and transceivers #1 and #2 of node 12d) have selected the same home channels (i.e., channels two and seven, respectively). Because at least one corresponding transceiver of nodes 12c and 12d have each selected the same home channel, nodes 12c and 12d have link-layer connectivity. In this particular example, since both corresponding transceivers of nodes 12c and 12d have selected the same home channels, nodes 12c and 12d have link-layer connectivity with each other using either transceiver #1 or #2.

In the illustrated example, similar relationships exist between each node 12 of node group 10 and its neighboring nodes 12, such that each node shares at least one transceiver in common with each of its neighboring nodes 12. It should be understood that, in certain embodiments, a node 12 need not share the same transceiver with each of its neighboring nodes 12. For example, in the illustrated embodiment, node 12c shares transceiver #1 in common with nodes 12a, 12b, and 12d (i.e., the corresponding transceivers of each of these nodes, transceiver #1, have each selected channel two as their respective home channels). On the other hand, node 12c shares transceiver #2 in common with nodes 12d and 12e (i.e., the corresponding transceivers of each of these nodes, transceiver #2, have each selected channel seven as their respective home channels).

In certain embodiments, certain nodes 12 may have direct link-level connectivity with one another while other nodes 12 may not. For example, node 12a and node 12c have direct link-level connectivity with each other while nodes 12a and node 12e do not. However, nodes 12a and 12e are able to communicate indirectly after convergence by routing the messages via node 12c or via nodes 12b and either node 12c or node 12d.

In certain embodiments, a group 10 that includes one or more nodes 12 each having multiple transceivers may form or reform one or more sub-networks within a network. For example, a node 12 may communicate with a first neighboring node 12 using a first corresponding transceiver on a first channel. In this example, the node 12 may communicate with a second neighboring node 12 using a second corresponding transceiver on a second channel. In the example illustrated in FIG. 4, for example, nodes 12a, 12b, 12c, and 12d communicate using shared transceiver #1 on channel two. Nodes 12c, 12d, and 12e communicate using shared transceiver #2 on channel seven (as described above, nodes 12c and 12d may actually communicate using either of shared transceivers #1 and #2 on channels two and seven, respectively). Thus, all of nodes 12a, 12b, 12c, 12d, and 12e form a network and are able to communicate with one another (either directly or indirectly via intermediate nodes). However, these nodes 12 also form at least two sub-networks, with nodes 12a, 12b, 12c, and 12d forming a first sub-network and nodes 12c, 12d, and 12e forming a second sub-network. In this example, either of nodes 12c and 12d form a bridging function for nodes 12a and 12b to exchange data-plane messages with node 12e. In certain embodiments, the ability to automatically form sub-networks may decrease the time that it takes of a node group such as node group 10 to form or reform a network.

To reach the states illustrated in FIG. 4 from the state illustrated in FIG. 3, a DDCS node 12 may periodically probe, listen to, or otherwise use available channels to determine whether it should change channels. With respect to probing, a probing node 12 is a node 12 that is transmitting a probe message, and a receiving node 12 is a node 12 that is receiving a probe message. A primary user is a user with super-ordinate right to use a particular channel, and a secondary user is a user with subordinate right to the use of a channel. In certain embodiments, when a primary user begins operation on a channel, secondary users within range must vacate the channel. In certain embodiments, DDCS may be implemented as a protocol that may be integrated into existing and new protocol stacks to enable DDCS.

Figure 5:
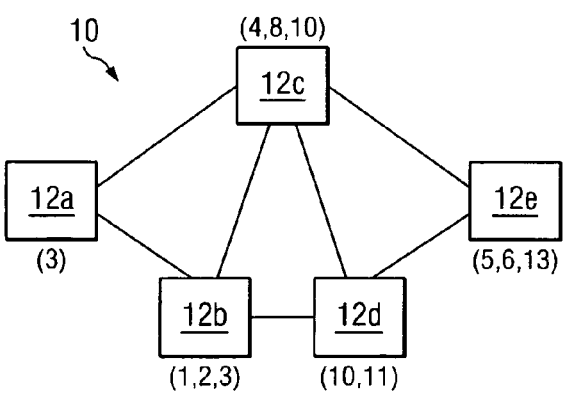
FIG. 5 illustrates an example DDCS node group of DDCS nodes, prior to convergence, in which the number of transceivers-per-node varies, with certain nodes being single-transceiver nodes and certain nodes being multiple-transceiver nodes.

FIG. 5 illustrates an example DDCS node group 10 of DDCS nodes 12, prior to convergence, in which the number of transceivers-per-node 12 varies, with certain nodes 12 being single-transceiver nodes 12 and certain nodes being multiple-transceiver transceiver nodes 12. In particular, FIG. 5 illustrates five nodes 12a-12e prior to convergence onto one or more suitable channels such that each node 12 is able to exchange data with each of its neighboring nodes 12. In this example, each node 12 has selected different corresponding home channels than its neighbors. In other words, the corresponding transceivers in neighboring nodes 12 have selected different home channels.

For example, node 12a has a single transceiver, transceiver #1 (e.g., as indicated by the single number in the parenthesis adjacent to node 12a), which has selected channel three as its home channel (e.g., as indicated by the value of the single number in the parenthesis adjacent to node 12a). Node 12b, a neighbor of node 12a, has three transceivers, transceivers #1, #2, and #3, which have selected channels one, two, and three, respectively, as their home channels. Nodes 12a and 12b only include one corresponding transceiver (i.e., transceiver #1 of node 12a and transceiver #1 of node 12b). However, because this corresponding transceiver for each of nodes 12a and 12b has selected different home channels, nodes 12a and 12b do not share a transceiver and thus do not have link-layer connectivity with each other. For example, the corresponding transceivers of nodes 12a and 12b (i.e., transceivers #1 of nodes 12a and 12b) have each selected different home channels (e.g., channels three and one, respectively) and thus do not have link-layer connectivity with each other.

As another example, node 12c has three transceivers, transceivers #1, #2, and #3, which have selected channels four, eight, and ten, respectively, as their home channels. Node 12d, a neighbor of node 12c, has two transceivers, transceivers #1 and #2, which have selected channels ten and eleven, respectively, as their home channels. Nodes 12c and 12d have two corresponding transceivers, transceivers #1 in both nodes and transceivers #2 in both nodes. However, because neither of the corresponding transceivers has selected the same home channel, nodes 12c and 12d do not share a transceiver and do not have link-layer connectivity with each other. For example, first corresponding transceivers of nodes 12c and 12d (i.e., transceiver #1 of node 12c and transceiver #1 of node 12d) have each selected different home channels (i.e., channels four and ten, respectively) and thus do not have link-layer connectivity with each other. As another example, second corresponding transceivers of nodes 12c and 12d (i.e., transceiver #2 of node 12c and transceiver #2 of node 12d) have each selected different home channels (e.g., channels eight and eleven, respectively) and thus do not have link-layer connectivity with each other. Additionally, although nodes 12c and 12d each include a transceiver that has selected channel ten (i.e., transceiver #3 of node 12c and transceiver #1 of node 12d), in certain embodiments, nodes 12c and 12d still do not have link-layer connectivity because no corresponding transceiver in each of these nodes 12 has selected the same channel (i.e., transceiver #1 of node 12c has selected a different home channel than transceiver #1 of node 12d, and transceiver #2 of node 12c has selected a different home channel than transceiver #2 of node 12d). In other words, node pairs (12a, 12b) and (12c, 12d) are not linked because corresponding transceivers do not have the same home channel, although non-corresponding transceivers do have the same home channel.

Similar relationships (e.g., the lack of a shared transceiver) exist for each of the other sets of neighboring nodes. For example, in addition to lacking a shared transceiver with node 12b, node 12a does not share a transceiver with node 12c, its other neighboring node. As another example, node 12b does not share a transceiver with any of its neighbors (i.e., nodes 12a, 12c, and 12d). As another example, node 12c does not share a transceiver with any of its neighbors (i.e., nodes 12a, 12b, 12d, and 12e). As another example, node 12d does not share a transceiver with any of its neighbors (i.e., nodes 12b, 12c, and 12e). As another example, node 12e does not share a transceiver with any of its neighbors (i.e., nodes 12c and 12d).

In certain embodiments, because no corresponding transceiver in any of neighboring nodes 12 has selected the same home channel, none of the neighboring nodes 12 in node group 10 have link-layer connectivity with each other. This situation could arise, for example, if nodes 12 power-on simultaneously and randomly select initial home channels. In certain embodiments, because each node 12 has selected a different home channel than its neighboring nodes 12, it does not have link-layer connectivity with its neighboring nodes 12.

As described with reference to FIGS. 1 and 3, each DDCS node 12 within a network individually decides when to change channels based on its local sensing of channel conditions, DDCS control message exchanges with other nodes 12, and any other suitable information. Each node 12, after changing channels, may attract its peer nodes 12 on one of its previous channels to one of its new channels if appropriate.

Figure 6:
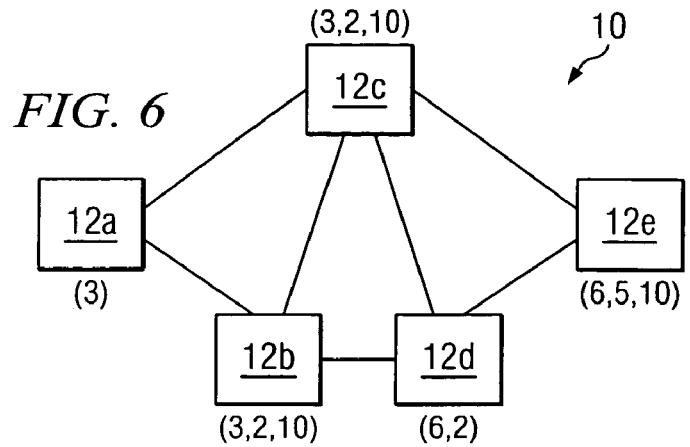
FIG. 6 illustrates the example DDCS node group of FIG. 5 after the nodes of the node group have converged.

FIG. 6 illustrates the example DDCS node group 10 of FIG. 5 after the nodes 12 of node group 10 have converged. For example, the nodes 12 of node group 10 may have converged in such a manner that each node 12 in node group 10 shares at least one channel (i.e., has a shared transceiver) with each of its neighboring nodes 12. Therefore, each node 12 has link-layer connectivity with all of its neighbors, and nodes 12 of node group 10 form a network of nodes 12. Nodes 12 within node group 10 are fully connected in that any node 12 within node group 10 can communicate with any other node 12 within node group 10 either directly or indirectly by routing messages via intermediate nodes 12.

For example, node 12a has a single transceiver, transceiver #1, which has selected channel three as its home channel. Node 12b, a neighbor of node 12a, has three transceivers, transceivers #1, #2, and #3, which have selected channels three, two, and ten, respectively, as their home channels. As described above with reference to FIG. 5, nodes 12a and 12b only include one corresponding transceiver (i.e., transceiver #1 of node 12a and transceiver #1 of node 12b). Transceiver #1 of node 12a and its corresponding transceiver #1 of node 12b have both selected channel three as their respective home channels. Because at least one corresponding transceiver of nodes 12a and 12b (i.e., transceiver #1 of node 12a and transceiver #1 of node 12b) have each selected the same home channel (i.e., channel three), nodes 12a and 12b have link-layer connectivity with each other using transceivers #1.

As another example, node 12c, a neighbor of node 12a, has three transceivers, transceivers #1, #2, and #3, which have selected channels three, two, and ten, respectively, as their home channels. Nodes 12a and node 12c only include a single corresponding transceiver (i.e., transceiver #1 of node 12a and transceiver #1 of node 12b). Transceiver #1 of node 12a and its corresponding transceiver #1 of node 12c have both selected channel three as their respective home channels. Because at least one corresponding transceiver of nodes 12a and 12c (i.e., transceiver #1 of node 12a and transceiver #1 of node 12c) have each selected the same home channel (i.e., channel three), nodes 12a and 12c have link-layer connectivity with each other using transceivers #1.

As another example, node 12*d*, a neighbor of node 12*c*, has two transceivers, transceivers #1 and #2, which have selected channels six and two, respectively, as their home channels. Nodes 12*c* and node 12*d* have two corresponding transceivers, transceivers #1 and transceivers #2. Transceiver #2 of node 12*c* and its corresponding transceiver #2 of node 12*d* have both selected channel two as their respective home channels. Because at least one corresponding transceiver of nodes 12*c* and 12*d* have each selected the same home channel, nodes 12*c* and 12*d* have link-layer connectivity with each other.

As another example, node 12*e*, a neighbor of node 12*c*, has three transceivers, transceivers #1, #2, and #3, which have selected channels six, five, and ten, respectively, as their home channels. Nodes 12*c* and node 12*e* have three corresponding transceivers, transceivers #1, #2, and #3. Transceiver #3 of node 12*c* and its corresponding transceiver #3 of node 12*c* have both selected channel ten as their respective home channels. Because at least one corresponding transceiver of nodes 12*c* and 12*e* have each selected the same home channel, nodes 12*c* and 12*e* have link-layer connectivity with each other.

In the illustrated example, similar relationships exist between each node 12 of node group 10 and its neighboring nodes 12, such that each node shares at least one transceiver in common with each of its neighboring nodes 12. As described above with reference to FIG. 4, it should be understood that, in certain embodiments, a node 12 need not share the same transceiver with each of its neighboring nodes 12. For example, in the illustrated embodiment, node 12*c* shares transceiver #1 in common with nodes 12*a* and 12*b* (i.e., the corresponding transceivers of each of these nodes, transceiver #1, have each selected channel three as their. respective home channels). On the other hand, node 12*c* shares transceiver #2 in common with node 12*d* (i.e., the corresponding transceivers of nodes 12*c* and 12*d*, transceiver #2, have each selected channel two as their respective home channels), and shares transceiver #3 in common with node 12*e* (i.e., the corresponding transceivers of nodes 12*c* and 12*e*, transceiver #3, have each selected channel ten as their respective home channels).

In certain embodiments, certain nodes 12 may have direct link-level connectivity with one another after DDCS home channel negotiation is complete while other nodes 12 may not. For example, node 12*a* and node 12*c* have direct link-level connectivity with each other while node 12*a* and node 12*e* are able to communicate indirectly by routing the messages via node 12*c* or via nodes 12*b* and either node 12*c* or node 12*d*.

As described above with reference to FIG. 4, in certain embodiments, a group 10 that includes one or more nodes 12 each having multiple transceivers may form or reform one or more sub-networks within a network. In certain embodiments, this ability may exist even if one or more nodes 12 of node group 10 includes only a single transceiver. In the example illustrated in FIG. 6, for example, nodes 12*a* (which only includes one transceiver), 12*b*, and 12*c* communicate on channel three using shared transceiver #1. Nodes 12*b*, 12*c*, and 12*d* may communicate on channel two using shared transceiver #2. Nodes 12*c* and 12*e* may communicate on channel ten using shared transceiver #3. Nodes 12*d* and 12*e* may communicate on channel six using shared transceiver #1. Thus, all of nodes 12*a*, 12*b*, 12*c*, 12*d*, and 12*e* form a network and are able to communicate with one another (either directly or indirectly via intermediate nodes 12). However, these nodes 12 also form at least four sub-networks, with nodes 12*a*, 12*b*, and 12*c* forming a first sub-network (i.e., using shared transceiver #1, channel three), nodes 12*b*, 12*c*, and 12*d* forming a second sub-network (i.e., using shared transceiver #2, channel two), nodes 12*c* and 12*e* forming a third sub-network (i.e., using shared transceiver #3, channel ten), and nodes 12*d* and 12*e* forming a fourth sub-network (i.e., using shared transceiver #1, channel six). The ability to form sub-networks may decrease the time that it takes of a node group such as node group 10 to form or reform a network.

To reach the states illustrated in FIG. 6 from the state illustrated in FIG. 5, a DDCS node 12 may periodically probe, listen to, or otherwise use available channels to determine whether it should change channels. With respect to probing, a probing node 12 is a node 12 that is transmitting a probe message, and a receiving node 12 is a node 12 that is receiving a probe message. A primary user is a user with super-ordinate right to use a particular channel, and a secondary user is a user with subordinate right to the use of a channel. In certain embodiments, when a primary user begins operation on a channel, secondary users within range must vacate the channel. In certain embodiments, DDCS may be implemented as a protocol that may be integrated into existing and new protocol stacks to enable DDCS.

With respect to FIGS. 1-6, although a particular number of nodes 12 are illustrated, the present invention contemplates node group 10 including any suitable number of nodes 12, according to particular needs. Additionally, although each node 12 is described as including a particular number of transceivers, the present invention contemplates each node 12 including any suitable number of transceivers, according to particular needs.

The operational scenario described with reference to FIGS. 1-2 may be referred to as DDCS-Single Transceiver or DDCS-ST. The operational scenario described with reference to FIGS. 3-6 may be referred to as DDCS-Multiple Transceiver or DDCS-MT. The DDCS-MT protocol allows nodes within an ad-hoc network to establish data link connectivity to all of their neighbors, and maintain this connectivity despite dynamic changes in node topology and the appearance or disappearance of primary users or interference sources. While the DDCS-ST protocol may solve certain problems for a group of nodes 12 that each include a single transceiver, in certain embodiments, DDCS-MT generalizes the DDCS-ST solution for nodes 12 that each include any suitable number of transceivers. In certain embodiments, DDCS-MT is backward compatible with DDCS-ST such that nodes 12 that include a single transceiver or node groups that include a single transceiver may be converged using the DDCS-MT protocol. Additionally, as described above with reference to FIGS. 5-6, nodes having varying numbers of transceivers (including nodes having a single transceiver) may be converged using the DDCS-MT protocol.

FIGS. 7-10 illustrate example scenarios involving two DDCS nodes 12. Each of these example scenarios is described below.

Figure 7:
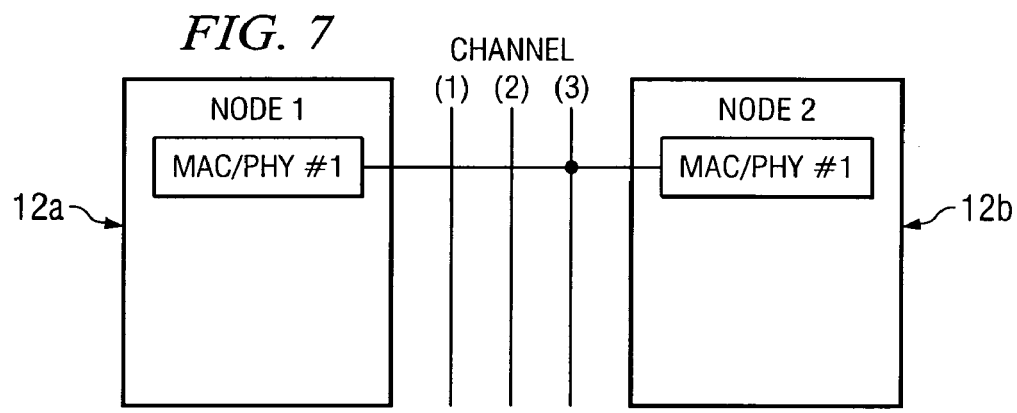
FIG. 7 illustrates a first example scenario involving two DDCS nodes that each includes a single transceiver.

FIG. 7 illustrates a first example scenario involving two DDCS nodes 12*a* and 12*b* that each includes a single transceiver #1. In this example, nodes 12*a* and 12*b* include a corresponding transceiver (i.e., transceiver #1). The corresponding transceivers #1 of nodes 12*a* and 12*b* share the same home channel (i.e., channel three). Thus, nodes 12*a* and 12*b* share a transceiver (i.e., transceiver #1). Because nodes 12*a* and 12*b* share at least one transceiver, nodes 12*a* and 12*b* have link-layer connectivity with one another using their respective transceivers #1. The DDCS-ST protocol may allow a group of nodes 12, each having only one data transceiver, to negotiate a common home channel satisfactory to all nodes 12. In certain embodiments, the DDCS-MT protocol is backwardly compatible with this operational scenario.

Figure 8:
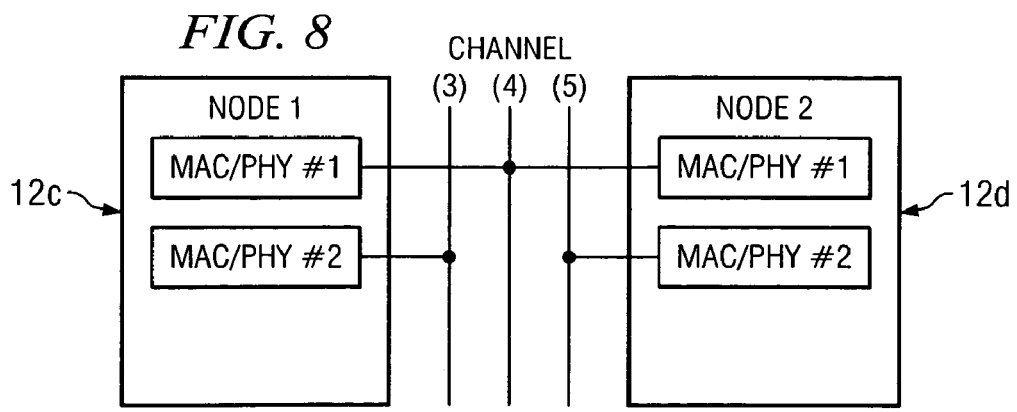
FIG. 8 illustrates a second example scenario involving two DDCS nodes that each includes two transceivers.

FIG. 8 illustrates a second example scenario involving two DDCS nodes 12*c* and 12*d* that each include two transceivers, transceivers #1 and #2. In this example, nodes 12c and 12d include two corresponding transceivers (i.e., transceiver #1 of node 12c corresponds to transceiver #1 of node 12d, and transceiver #2 of node 12c corresponds to transceiver #2 of node 12d). Corresponding transceivers #1 of nodes 12c and 12d share the same home channel (i.e., channel four). Thus, nodes 12c and 12d share a transceiver (i.e., transceiver #1). Because nodes 12c and 12d share at least one transceiver, nodes 12c and 12d have link-layer connectivity with one another using their respective transceivers #1. Transceiver #2 of node 12c and transceiver #2 of node 12d, despite being corresponding transceivers for nodes 12c and 12d, do not have link-layer connectivity with each other because their home channels differ. In particular, transceiver #2 of node 12c has selected channel three as its home channel, and transceiver #2 of node 12d has selected channel five as its home channel.

Figure 9:
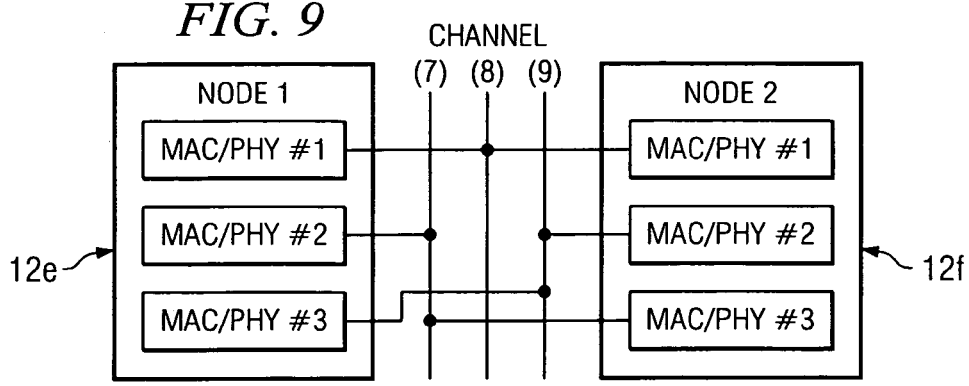
FIG. 9 illustrates a third example scenario involving two DDCS nodes that each includes three transceivers.

FIG. 9 illustrates a third example scenario involving two DDCS nodes 12e and 12f that each include three transceivers, transceivers #1, #2, and #3. In this example, nodes 12e and 12f include three corresponding transceivers (i.e., transceiver #1 of node 12e corresponds to transceiver #1 of node 12f, transceiver #2 of node 12e corresponds to transceiver #2 of node 12f, and transceiver #3 of node 12e corresponds to transceiver #3 of node 12f). Corresponding transceivers #1 of nodes 12e and 12f share the same home channel (i.e., channel eight). Thus, nodes 12e and 12f share a transceiver (i.e., transceiver #1). Because nodes 12e and 12f share at least one transceiver, nodes 12e and 12f have link-layer connectivity with one another using their respective transceivers #1.

Transceiver #2 of node 12e and transceiver #2 of node 12f, despite being corresponding transceivers for nodes 12e and 12f, do not have link-layer connectivity with each other because their home channels differ. In particular, transceiver #2 of node 12e has selected channel seven as its home channel, and transceiver #2 of node 12f has selected channel nine as its home channel. Additionally, transceiver #3 of node 12e and transceiver #3 of node 12f, despite being corresponding transceivers for nodes 12e and 12f, do not have link-layer connectivity with each other because their home channels differ. In particular, transceiver #3 of node 12e has selected channel nine as its home channel, and transceiver #3 of node 12f has selected channel seven as its home channel. In certain embodiments, even though transceiver #2 of node 12e and transceiver #3 of node 12f have both selected channel seven as their respective home channels, nodes 12e and 12f do not have link-layer connectivity using transceivers #2 (for node 12e) and #3 (for node 12f) because transceiver #2 of node 12e and transceiver #3 of node 12f are not corresponding transceivers. A similar relationship exists between transceiver #3 of node 12e and transceiver #2 of node 12f.

Figure 10:
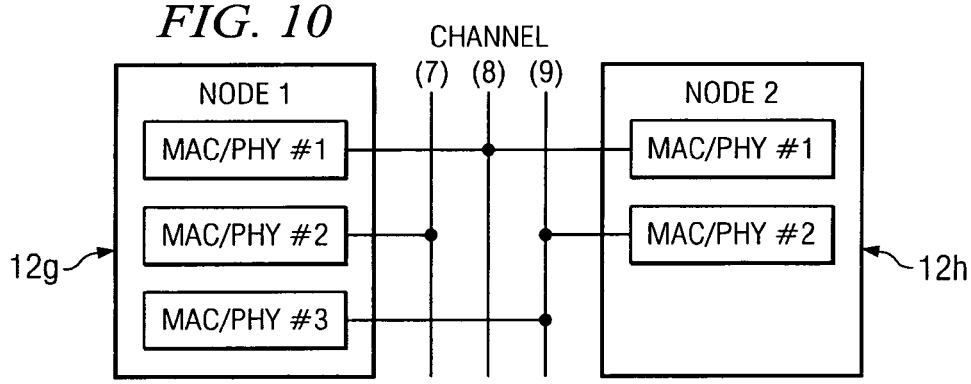
FIG. 10 illustrates a fourth example scenario involving two DDCS nodes, a first node including three transceivers and a second node including two transceivers.

FIG. 10 illustrates a fourth example scenario involving two DDCS nodes, first node 12g including three transceivers (transceivers #1, #2, and #3) and second node 12h including two transceivers (transceivers #1 and #2). In certain embodiments, the DDCS-MT protocol can support deployments involving nodes 12 with differing numbers of transceivers, such as nodes 12g and 12h. In this example, nodes 12g and 12h include two corresponding transceivers (i.e., transceiver #1 of node 12g corresponds to transceiver #1 of node 12h and transceiver #2 of node 12g corresponds to transceiver #2 of node 12h). Corresponding transceivers #1 of nodes 12g and 12h share the same home channel (i.e., channel eight). Thus, nodes 12g and 12h share a transceiver (i.e., transceiver #1). Because nodes 12g and 12h share at least one transceiver, nodes 12g and 12h are able to perform data transfers with one another using their respective transceivers #1.

Transceiver #2 of node 12g and transceiver #2 of node 12h, despite being corresponding transceivers for nodes 12g and 12h, do not have link-layer connectivity with each other because their home channels differ. In particular, transceiver #2 of node 12g has selected channel seven as its home channel, and transceiver #2 of node 12h has selected channel nine as its home channel. In certain embodiments, since there is no transceiver of node 12h that corresponds to transceiver #3 of node 12g, node 12g would not be able to use transceiver #3 to establish link-layer connectivity with node 12h.

Figure 11:
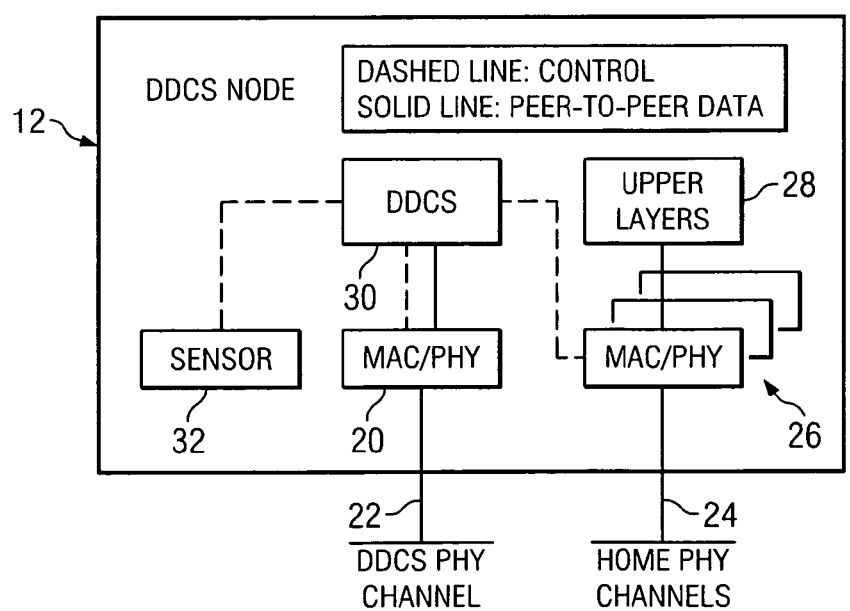
FIG. 11 illustrates an example architecture of a node in which a transceiver of the node and a physical channel are reserved for transmission and reception of DDCS control messages.
Figure 12:
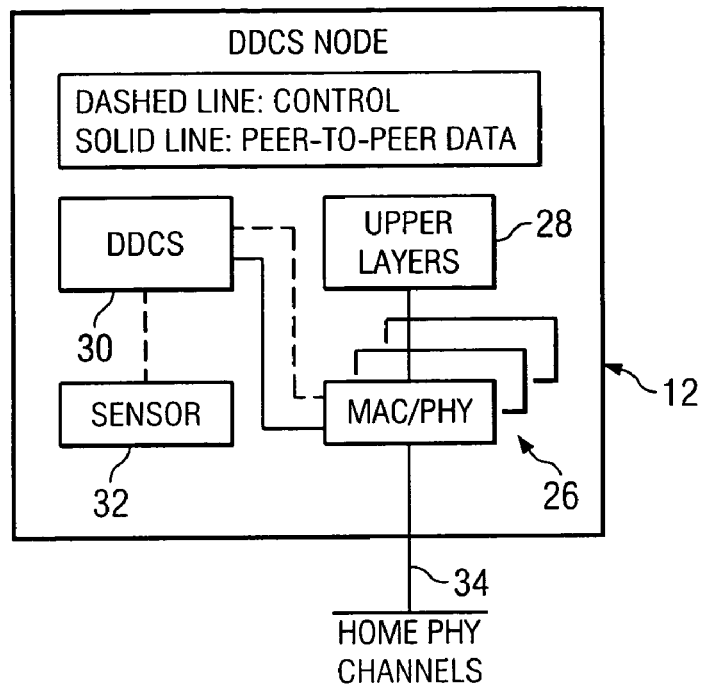
FIG. 12 illustrates an example architecture of a node in which the use of one or more transceivers is shared between the transmission and reception of DDCS control messages and the transmission and reception of upper layer data.

FIGS. 11-12 illustrate example node architectures according to certain embodiments of the present invention. Nodes 12 may include any suitable components and may be structured in a variety of manners, according to particular needs. For example, in certain embodiments, a node 12 may include a transceiver that is dedicated to DDCS signaling. As another example, in certain embodiments, a node 12 may perform DDCS signaling by sharing one or more data transceivers with the upper layers. Nodes of each of these types, and any other suitable types, may be used in combination if desired or otherwise appropriate. As another example, in certain embodiments, a node 12 may include a physical layer resource dedicated to establishing connectivity with other nodes 12 in a node group 10, which may reduce or eliminate the need to perform channel scanning.

In certain embodiments, the DDCS-MT protocol uses an auxiliary protocol to establish temporary or permanent link-layer connectivity between nodes so that the nodes can exchange DDCS-MT control messages. This connectivity may be achieved in conjunction with the DDCS-MT protocol in any suitable manner, according to particular needs.

FIG. 11 illustrates an example architecture of a node 12 in which a transceiver 20 of node 12 and a physical channel 22 are reserved for the transmission and reception of DDCS control messages. Transceiver 20 may transmit and receive medium access control (MAC) messages or other control messages using channel 22. In certain embodiments, DDCS may be integrated into any suitable MAC layer and/or physical (PHY) layer protocol in any suitable manner, according to particular needs. In certain embodiments, the DDCS control messages may share DDCS channel 22 with other MAC messages or other control messages that support home channels 24 associated with one or more data transceivers 26.

In certain embodiments in which a transceiver 20 of node 12 is dedicated to DDCS channel scanning operations, DDCS-MT messages are not multiplexed with upper layer 28 data traffic through one or more shared transceivers. Node 12 may include a DDCS module 30 for implementing the DDCS-MT protocol. DDCS module 30 may perform control signaling with a sensor 32 to retrieve sensor data, send channel change request control messages to dedicated transceiver 20 during the DDCS channel scanning operation, and send a channel change request control message to one or more of data transceivers 26 after negotiating a home channel change with one or more neighboring nodes 12 using the DDCS-MT protocol. DDCS module 30 may initiate broadcasting of DDCS-MT messages to neighboring nodes 12 using dedicated transceiver 20. Upper layers 28 may use data transceivers 26 to send control and data messages to neighboring nodes 12.

In certain embodiments, an advantage of the non-multiplexed architecture of node 12 (e.g., as illustrated in FIG. 11) is that DDCS channel data transfers may not disrupt or affect home channel 24 data transfers. However, in certain embodiments, a disadvantage of the non-multiplexed architecture may be the added node cost of the dedicated transceiver 20 and the complexity associated with dedicated transceiver 20.

FIG. 12 illustrates an example architecture of a node 12 in which the use of one or more transceivers 26 is shared between the transmission and reception of DDCS control messages and the transmission and reception of upper layer data. In other words, node 12 illustrated in FIG. 12 performs DDCS signaling by sharing one or more data transceivers 26 used for upper layer 28 message transfers, and DDCS signaling may be multiplexed with upper layer messages over the same physical channels 34. Transceivers 26 may transmit and receive MAC messages or other control messages. As described above with reference to FIG. 11, in certain embodiments, DDCS may be integrated into any suitable MAC layer and/or PHY layer protocol in any suitable manner, according to particular needs. In certain embodiments, the DDCS control messages may share a home channel 34 with other MAC messages or other control messages that support the same or other home channels 34.

In certain embodiments in which one or more data transceivers 26 are shared with upper layers 28 to perform DDCS signaling, DDCS-MT messages may be multiplexed with upper layer 28 data traffic onto one or more home channels 34. DDCS module 30 may exchange control messages with sensor 32 to retrieve sensor data, send channel change request control messages to one or more of data transceivers 26 during channel scanning operation, and send a final channel change request control message to one or more of data transceivers 26 after negotiating a home channel change with one or more neighboring nodes 12 using the DDCS-MT protocol. DDCS module 30 may initiate broadcasting of DDCS-MT messages to neighboring nodes using one or more of data transceivers 26. Upper layers 28 may use data transceivers 26 to send control and data messages to neighboring nodes 12.

In certain embodiments, an advantage of the multiplexed architecture of node 12 (e.g., as illustrated in FIG. 12) is that the multiplexed architecture may be less costly and complex to implement than the non-multiplexed architecture (e.g., as illustrated in FIG. 11) due to the lack of a dedicated transceiver 20 for DDCS operation. However, in certain embodiments, the reduction in cost and complexity may be balanced against possible periodic disruption of upper layer 28 data transfers caused by the multiplexing of DDCS message with upper layer messages on one or more home physical channels 34.

DDCS-MT may be deployed in nodes 12 using the non-multiplexed architecture (e.g., as illustrated in FIG. 11), multiplexed architecture (e.g., as illustrated in FIG. 12), or any other suitable architecture, singly or in any suitable combination. Throughout the remainder of this description, a particular DDCS node architecture is not specified with the understanding that either design, or any other suitable design, is feasible. Furthermore, although this document uses the term "transceiver" for clarity, it should be understood that an alternative approach involves multiple parallel receivers and a single channel-agile transmitter. In certain embodiments, the DDCS-MT protocol may be used with the multiple parallel receiver approach with little to no modification.

Each DDCS node 12 may maintain one or more DDCS node variables. In certain embodiments, the primary node variables include a node ID variable, a group ID variable, a number of transceivers variable, and, for each transceiver of the node 12, a home channel variable and a switch count variable. Although these node variables are primarily described, a node 12 may maintain any suitable number and types of node variables according to particular needs.

The node ID variable provides an identifier for the node and may be in any suitable format, according to particular needs. The group ID variable indicates the node group 10 membership of a node 12. In certain embodiments, a user configures the group ID variable, although the group ID variable may be configured in any suitable manner. The number of transceivers variable may indicate the number of data transceivers (e.g., data transceivers 26) of the node 12. The home channel variable for a transceiver of node 12 indicates the current home channel of the transceiver, which is the channel on which a node 12 may have link-layer connectivity with neighboring nodes 12 within the node group 10 of the node 12. More particularly, a home channel may refer to the channel a transceiver of a node 12 uses for data transfers (e.g., upper-layer data transfers) with neighboring nodes 12. A visited channel, on the other hand, is a channel on which a node 12 has temporary link-layer connectivity for the purpose of sending or receiving DDCS control messages such as a probe message.

The switch count variable for a transceiver of node 12 may reflect a precedence value within the DDCS-MT home channel negotiation protocol. A first node 12 may compare the value of the switch count variable for each of its own transceivers with the value of the switch count variable of each corresponding transceiver of a neighboring node 12 to determine which of the transceivers of the first node 12 are eligible to change its home channel to the home channel of the corresponding transceiver of the neighboring node 12 to achieve link-layer connectivity with the neighboring node 12. In certain embodiments, a higher switch count translates into a higher precedence, so in certain embodiments a node 12 with a transceiver having a higher value for its switch count variable will not change its associated home channel to the home channel of another node 12 that has a corresponding transceiver with a lower value of its switch count variable.

Figure 13:
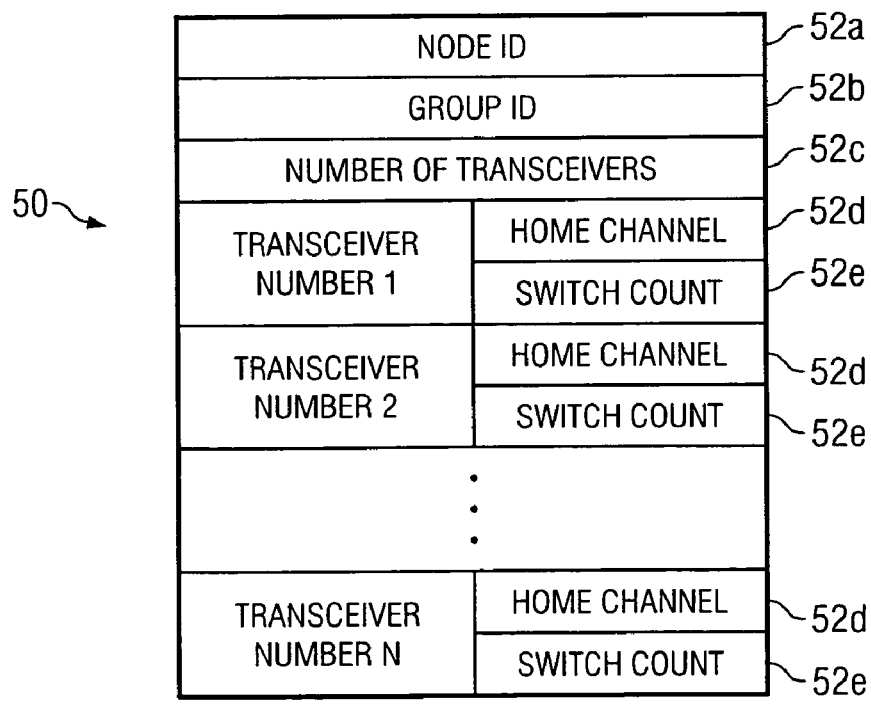
FIG. 13 illustrates an example format of a probe message that may be sent by a DDCS node.

FIG. 13 illustrates an example format of a probe message 50 that may be sent by a DDCS node 12. In certain embodiments, probe message 50 includes values for one or more node variables 52: a node ID variable 52a, a group ID variable 52b, a number of transceivers indicator 52c, a home channel variable 52d for each transceiver of the node 12, and one or more switch count variables 52e for each transceiver of the node 12.

Node ID variable 52a may provide a unique identifier for the node 12 and may be in any suitable format, according to particular needs. Group ID variable 52b may include an identifier of the node group 10 membership of the node 12. In certain embodiments, a user configures the group ID variable, although the group ID variable may be configured in any suitable manner. The number of transceivers variable 52c may indicate the number of transceivers of the node 12 that sent probe message 50. The transceivers for which number of transceivers variable 52c accounts may include any suitable combination of dedicated transceivers 20 and data transceivers 26, for example.

The home channel variable for a transceiver of node 12 indicates the current home channel of the transceiver, which is a channel on which a node 12 may have link-level connectivity with neighboring nodes 12 within the node group 10 of the node 12. More particularly, a home channel may refer to the channel a transceiver of a node 12 uses for data transfers (e.g., upper-layer data transfers) with neighboring nodes 12. A visited channel, on the other hand, is a channel on which a node 12 has temporary control-plane connectivity for the purpose of sending or receiving DDCS control messages such as a probe message.

The switch count variable for a transceiver of node 12 may reflect a precedence value within the DDCS-MT home channel negotiation protocol. A first node 12 may compare the value of the switch count variable for each of its own transceivers with the value of the switch count variable of each corresponding transceiver of a neighboring node 12 to determine which of the transceivers of the first node 12 are eligible to change its home channel to the home channel of the corresponding transceiver of the neighboring node 12 to achieve link-layer connectivity with the neighboring node 12. In certain embodiments, a higher switch count translates into a higher precedence, so in certain embodiments a node 12 with a transceiver having a higher value for its switch count variable will not change its associated home channel to the home channel of another node 12 that has a corresponding transceiver with a lower value of its switch count variable.

For each transceiver of the node 12 that sent probe message 50, message 50 may include a home channel variable 52d and a switch count variable 52e. For example, in the embodiment of probe message 50 illustrated in FIG. 13, message 50 includes transceivers #1-#N, each having an associated home channel variable 52d and switch count variable 52e. The home channel variable 52d for a particular transceiver may indicate the current home channel for that transceiver. The one or more switch count variables 52e will be described in more detail below. Additionally, the one or more switch count variables 52e may be referred to as control variables, for reasons made clear below.

Although a particular format is illustrated, the present invention contemplates probe message 50 having any suitable format according to particular needs. In certain embodiments, probe message 50 is a broadcast message such that there is no destination address. In an embodiment in which other variables are used, probe message 50 may include other fields that specify values for the other variables. The transmission time of a probe message 50 may be determined by a medium access contention resolution procedure or in any other suitable manner. Alternatively, probe messages 50 may be transmitted at random times. In an example in which the medium access contention resolution procedure is used, the medium access contention resolution procedure may be designed to reduce the probability that multiple nodes 12 will transmit a probe message 50 at substantially the same time. If multiple nodes 12 transmit a probe message 50 at substantially the same time, then interference and possible loss of the probe messages 50 may result. The medium access contention resolution procedure, or another suitable procedure for determining the transmission time of probe messages 50, may be designed in any suitable manner according to particular needs.

Figure 14:
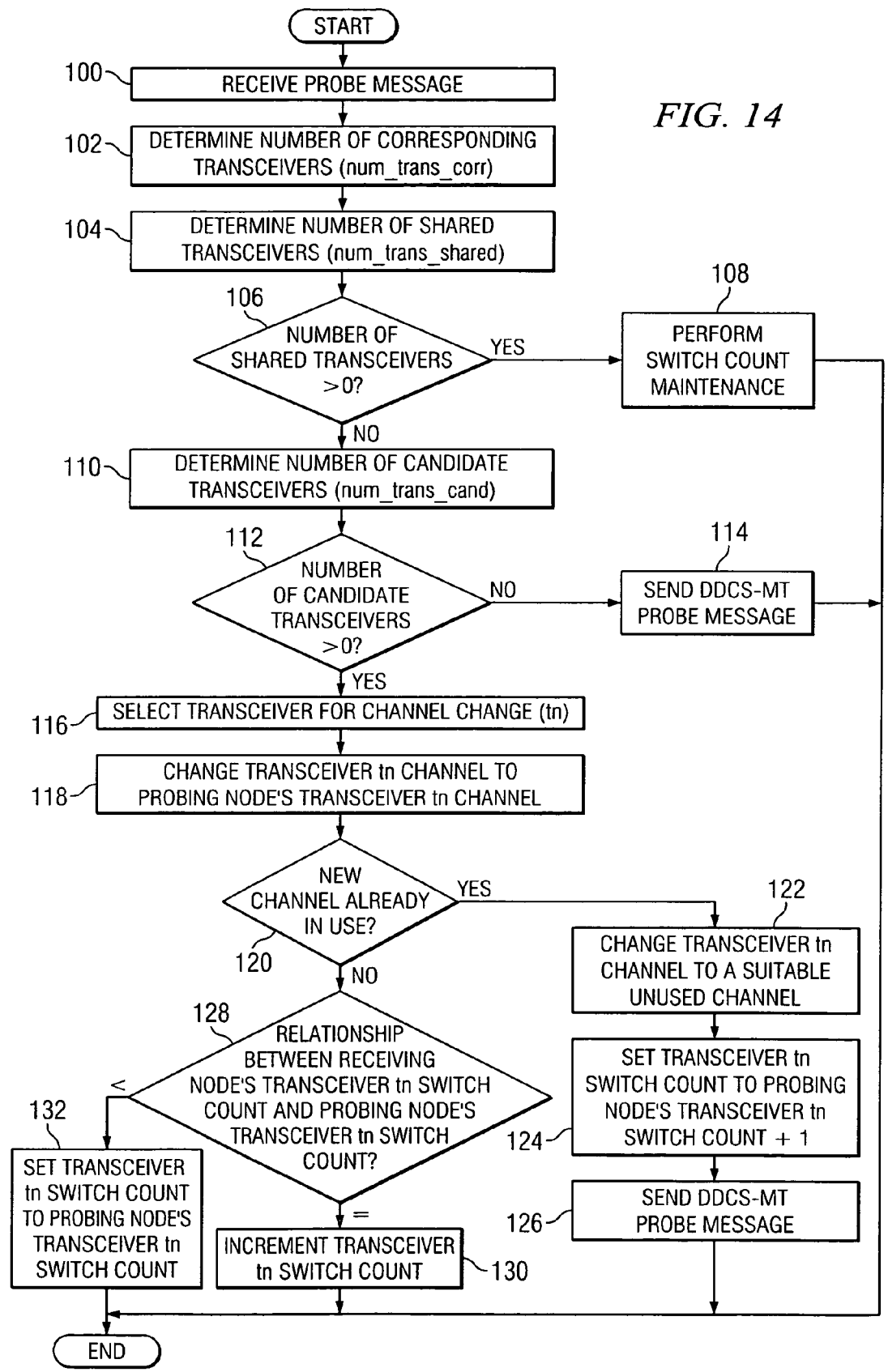
FIG. 14 illustrates an example method for processing a received probe message at a DDCS node.

FIG. 14 illustrates an example method for processing a received probe message 50 at a DDCS node 12. A node 12 receiving a probe message 50 may respond by ignoring the probe message 50 (e.g., not changing the node's state), sending a probe message 50 in response, changing the home channel value of one or more of the transceivers of the receiving node 12 (and thus switching the transceiver to a new home channel), changing the switch count value of each of one or more transceivers of the node 12, or in any other suitable manner according to particular needs. Throughout the example method described below, the node 12 that communicated the probe message 50 being received and processed will be referred to as probing node 12a, and the node 12 that receives and processes the probe message 50 will be referred to as receiving node 12b.

At step 100, receiving node 12b receives a probe message 50 from probing node 12a. At step 102, receiving node 12b determines the number of corresponding transceivers with probing node 12a. As described above, the number of corresponding transceivers between a probing node (e.g., node 12a) and a receiving node (e.g., node 12b) may be the number of transceivers of the receiving node that have a corresponding transceiver in the probing node. In certain embodiments, the number of corresponding transceivers may be the minimum of the number of probing node transceivers (e.g., as indicated by the number of transceivers variable 52c of probe message 50) and the number of transceivers of receiving node 12b. This may be represented mathematically as:

num_trans_corr=min (num_trans_probing_node, num_trans_receiving_node).

Using this algorithm, for example, if probing node 12a has five transceivers (i.e., transceivers #1, #2, #3, #4, and #5) and receiving node 12b has three transceive (i.e., transceivers #1, #2, and #3), then the number of corresponding transceivers is three. In this example, transceivers #4 and #5 of probing node 12a each have no corresponding transceiver in receiving node 12b and, in certain embodiments, will not participate in the DDCS-MT negotiation.

At step 104, receiving node 12b determines the number of shared transceivers between receiving node 12b and probing node 12a. Receiving node 12b may use the one or more home channel variables 52d of probe message 50 in making this determination. In certain embodiments, the number of transceivers shared between receiving node 12b and probing node 12a is the number of corresponding transceivers that also have the same home channel. For example, if probing node 12a includes five transceivers (transceivers #1, #2, #3, #4, and #5) with home channels ten, twelve, fifteen, four, and twenty-two, respectively, and receiving node 12b includes three transceivers (transceivers #1, #2, and #3) with home channels nine, ten, and fifteen, respectively, then the number of shared transceivers is one (transceiver #3 of probing node 12a and transceiver #3 of receiving node 12b, which are corresponding transceivers, have each selected channel fifteen as their home channel). In this example, the fact that node 12a, transceiver #1 and node 12b, transceiver #2 have the same channel is not reflected in the shared transceiver count because transceiver #1 of probing node 12a and transceiver #2 of receiving node 12b are not corresponding transceivers.

At step 106, receiving node 12b determines whether the number of shared transceivers is greater than zero. If it is determined at step 106 that the number of shared transceivers is greater than zero, then in certain embodiments, a link between receiving node 12b and probing node 12a already exists (i.e., nodes 12a and 12b are able to exchange data-plane messages) and no home channel changes are made by receiving node 12b. Instead, at step 108, receiving node 12b may perform switch count maintenance. For example, at step 108, receiving node 12b and probing node 12a may equalize the respective switch counts of their shared transceivers, if necessary (i.e., if they are not already equal). In certain embodiments, receiving node 12b uses the following algorithm to equalize the switch counts:

For each transceiver i shared between probing node 12a and receiving node 12b:
    If node 12a transceiver #i switch count > node 12b transceiver #i switch count
        Node 12b transceiver #i switch count = node 12a transceiver #i switch count
    Else if node 12a transceiver #i switch count < node 12b transceiver #i switch count
        Send DDCS-MT Probe Message 50 (if not already sent).

In certain embodiments, only one DDCS-MT probe message 50 should be sent per invocation of this algorithm. As an example, if probing node 32*a* and receiving node 32*b* share transceiver #3, and probing node 32*a*'s transceiver #3 has a switch count of twenty while receiving node 32*b*'s transceiver #3 has a switch count of ten, then receiving node 32*b* may update the switch count of its transceiver #3 to twenty. However, if probing node 32*a*'s transceiver #3 has a switch count of ten and receiving node 32*b*'s transceiver #3 has a switch count of twenty, then receiving node 32*b* may send a DDCS-MT probe message 50 so that probing node 32*a* may update its transceiver #3 switch count to twenty.

Returning to step 106, if it is determined at step 106 that the number of shared transceivers is zero, then receiving node 12*b* may be able to change the home channel of one of its transceivers to create a link with probing node 12*a* at step 110 and subsequent steps. The processing associated with this operation continues with step 110.

At step 110, receiving node 12*b* determines the number of transceivers that are eligible to have their home channel changed (i.e., the number of candidate transceivers, num_trans_cand). A candidate transceiver may be a transceiver that is eligible for home channel change in order to establish a link with probing node 32*a*. In certain embodiments, receiving node 32*b* may use the following algorithm to determine the number of candidate transceivers:

```
num_trans_cand = 0
For each transceiver #i common to probing node 12a and receiving
node 12b:
    If node 12a transceiver #i switch count >= node 12b
    transceiver #i switch count
        num_trans_cand = num_trans_cand + 1.
```

For example, if probing node 12*a* (3:6, 4:1, 5:10, 6:20) (i.e., home channel transceiver #1: switch count transceiver #1, home channel transceiver #2: switch count transceiver #2, home channel transceiver #3:switch count transceiver #3, and so on) sends a probe message 50 to receiving node 12*b* (30:5, 31:6, 32:10, 33:21), then the number of candidate transceivers of node 12*b* may be two (i.e., transceivers #1 and #3). In this example, transceivers #2 and #4 of receiving node 12*b* are not candidates for a channel change because their respective switch counts are higher than the respective switch counts of the corresponding transceivers of probing node 12*a*.

At step 112, receiving node 12*b* determines if the number of candidate transceivers (i.e., those transceivers of node 12*b* that are candidates to have their home channel changed) is greater than zero. If the number of candidate transceivers is zero (i.e., receiving node 12*b* has no transceivers that are candidates for a home channel change), then, in certain embodiments, all transceivers of receiving node 12*b* have switch counts higher than the corresponding transceivers in probing node 12*a* and, at step 114, receiving node 12*b* may send a DDCS-MT probe message 50 so that probing node 12*a* will change the home channel of one of its transceivers to establish a link with receiving node 12*b*.

If at step 112, receiving node 12*b* determines that the number of candidate transceivers is greater than zero (i.e., receiving node 12*b* has one or more transceivers that are candidates for a home channel change in order to establish a link with probing node 12*a*), then at step 116, receiving node 12*b* may select one or more of its transceivers that should change its home channel. In certain embodiments, the following algorithm may be used to make this selection:

```
For all node 12b candidate transceivers i:
    Count the number of linked neighboring nodes if transceiver # i
    is selected for home channel change
    Mark the candidate transceivers that maximize the number of linked
    neighboring nodes 12 (i.e., that maximize connectivity)
    If there is more than one candidate transceiver that maximizes
    connectivity:
        Select one of the marked transceivers for home channel change
        in a suitable manner
    Else:
        Select the candidate transceiver that maximizes connectivity
        for home channel change.
```

As an example, assume that receiving node 12*b* determines that its transceivers #1, #2, and #4 are candidates for home channel change. Furthermore, assume that receiving node 12*b* calculates that the number of linked neighboring nodes is five if transceiver #1 is selected for home channel change, three if transceiver #2 if selected for home channel change, and five if transceiver #4 is selected for home channel change. In this example, receiving node 12*b* may determine that candidate transceivers #1 and #4 maximize connectivity, and may select one of these transceivers for home channel change in a suitable manner. For example, receiving node 12*b* may randomly select a candidate transceiver for home channel change, may select the candidate transceiver with the best channel quality estimate for home channel change (e.g., based on a channel quality metric), may select the candidate transceiver with the least traffic load for home channel change (e.g., based on a channel utilization metric), or may select a candidate transceiver in any other suitable manner, according to particular needs.

At step 118, receiving node 12*b* changes the home channel of the one or more transceivers selected at step 116 to match the home channel of the corresponding transceiver of probing node 12*a*. As an example, assume that probing node 12*a* (3:6, 4:1, 5:10, 6:20) sends a DDCS-MT probe message 50 to receiving node 12*b* (30:5, 31:6, 32:10, 33:21). In this example, receiving node 12*b* has two candidate transceivers for channel change (i.e., transceivers #1 and #3). Furthermore, assume that receiving node 12*b* selects transceiver #3 for channel change. In this example, receiving node 12*b* may change the home channel of its transceiver #3 from channel thirty-two to channel five to establish link-layer connectivity with probing node 12*a*.

At step 120, receiving node 12*b* determines whether the new home channel assigned to the selected transceiver is already in use by another transceiver of receiving node 12*b*. Continuing with the above-described example, if receiving node 12*b* (30:5, 31:6, 32:10, 33:21) changes its transceiver #4 to channel thirty, then receiving node 12*b* may determine at step 120 that channel thirty is already being used by receiving node 12*b*'s transceiver #1. It should be noted that while the method described with reference to FIG. 14 is described as including the determination made at step 120, in certain embodiments, multiple transceivers of a node 12 may use the same home channels. This may mean, in certain embodiments, that the example method described with reference to FIG. 14 could proceed from step 118 to 128, bypassing or eliminating steps 120 through 126.

Continuing with the example in which steps 120 through 126 are included, if receiving node 12*b* determines at step 120 that the new home channel assigned to the selected transceiver is already in use by another transceiver of receiving node 12*b*, then at step 122, receiving node 12*b* may change the home channel of the transceiver selected at step 116 to a suitable home channel that is unused by another transceiver of receiving node 12b. Any suitable algorithm may be used to determine the suitable unused channel. As just one example, receiving node 12b may randomly select another home channel for the selected transceiver and then determine whether that channel is already in use by another transceiver of node 12b. Assume, for example, that receiving node 12b (30:5, 31:6, 32:10, 33:21) changes its transceiver #4 to channel thirty at step 118. At step 122, receiving node 12b could determine that channel forty is suitable for transceiver #4 and perform the home channel change.

At step 124, receiving node 12b may set the switch count of the selected transceiver to one greater than the switch count of the corresponding transceiver in probing node 12a. At step 126, receiving node 12b may broadcast or otherwise communicate a DDCS-MT probe message 50, which might include an indication of the new home channel selected for the selected transceiver and the new switch count for the selected transceiver. In certain embodiments, because at step 124 receiving node 12b set the switch count of the selected transceiver to one greater than the switch count of the corresponding transceiver in probing node 12a, the transceiver of probing node 12a that corresponds to the selected transceiver of receiving node 12b (which had its home channel changed at step 122) may be a candidate transceiver for probing node 12a when probing node 12a receives the probe message 50 sent by receiving node 12b at step 124. When probing node 12 a receives probe message 50 communicated by receiving node 12b at step 126, probing node 12a may change the home channel of one of its transceivers (possibly the transceiver of node 12a that corresponds to the transceiver of node 12b that had its home channel changed at step 122) to establish a link with receiving node 12b.

As an example, assume that probing node 12a (3:1, 4:1, 5:1, 30:20) sends a DDCS-MT probe message 50 to receiving node 12b (30:5, 31:5, 32:5, 33:5). Assume further that receiving node 12b determines that channel forty is suitable for transceiver #4, and performs the channel change (i.e., at step 122). In this example, at step 124, receiving node 12b may set the switch count of transceiver #4 to twenty-one, and the resulting state for receiving node 12b may be (30:5, 31:5, 32:5, 40:21).

Returning to step 120, if receiving node 12b determines that the new home channel assigned to the selected transceiver is not already in use by another transceiver of receiving node 12b, then the example method proceeds to step 128. At step 128, receiving node 12b determines a relationship between the switch count of the selected transceiver of receiving node 12b and the switch count of the corresponding transceiver of probing node 12b. For example, receiving node 12b may determine whether the switch count of the selected transceiver of receiving no 12b is less than or equal to the switch count of the corresponding transceiver of probing node 12b.

If receiving node 12b determines at step 128 that the switch count of the selected transceiver is equal to the switch count of the corresponding transceiver of probing node 12b, then at step 130, receiving node 12b may increment the switch count of the selected transceiver. For example, if probing node 12a (3:1, 4:1, 5:1, 6:20) sent probe message 50 to receiving node 12b (30:5, 31:5, 32:5, 33:20), then receiving node 12b may set the home channel of its transceiver #4 to channel six at step 118, determine that the switch count of transceiver #4 is equal to the switch count of corresponding transceiver #4 of probing node 12a, and set the switch count of receiving node 12b's transceiver #4 to 21 at step 130.

If receiving node 12b determines at step 128 that the switch count of the selected transceiver is less than the switch count of the corresponding transceiver of probing node 12b, then at step 132, receiving node 12b may set the switch count of the selected transceiver to the switch count of the corresponding transceiver in probing node 12a. For example, if probing node 12a (3:1, 4:1, 5:1, 6:20) sent probe message 50 to receiving node 12b (30:5, 31:5, 32:5, 33:5), then receiving node 12b may set the home channel of its transceiver #4 to channel six at step 118, determine that the switch count of transceiver #4 is less than the switch count of corresponding transceiver #4 of probing node 12a, and set the switch count of receiving node 12b's transceiver #4 to 20 at step 132.

The example method described above with reference to FIG. 14 assumed that the group of probing node 12a and the group of node 12b were equal or that such a consideration was not relevant. In certain embodiments, in response to receiving a probe message 50 from a probing node 12a, receiving node 12b may determine whether the group ID of probing node 12a (e.g., based on the group ID variable 52b) equals the group ID of the receiving node 12b. If receiving node 12b determines that the group IDs of receiving node 12b and probing node 12a are not equal, then, in certain embodiments, receiving node 12b may discard or otherwise disregard probe message 50.

Although a particular method has been described with reference to FIG. 14, the present invention contemplates any suitable method in accordance with the present invention. Thus, certain of the steps described with reference to FIG. 14 may take place substantially simultaneously and/or in different orders than as shown and described. Moreover, the present invention contemplates methods with additional steps, fewer steps, and/or different steps, so long as the methods remain appropriate.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A first node among a plurality of distributed nodes capable of forming or reforming a communication network between the plurality of distributed nodes, each node in the plurality of distributed nodes comprising one or more transceivers, the first node comprising:

a memory for storing values for one or more node variables for the first node; and a plurality of transceivers;

the first node operable to:

spontaneously and independent of a centralized controller associated with the network, transmit a probe message for purposes of forming or reforming a network;

receive a probe message from a second node for purposes of forming or reforming a network, the probe message comprising values for one or more node variables for the second node;

compare the values for the one or more node variables for the first node to the values for the one or more node variables for the second node within the probe message received from the second node to determine, independent of a centralized controller associated with the network, whether the first node should set a home channel of one of its transceivers to a new channel; and if it is determined that the first node should set the home channel of one of its transceivers to the new channel:
determine from the plurality of transceivers of the first node an appropriate transceiver the home channel of which to set to the new channel; and
set the home channel of the determined appropriate transceiver of the first node to the new channel.

2. The first node of claim 1, wherein the one or more node variables for a node comprise:
a home channel variable for each of one or more transceivers of the node identifying the home channel of that transceiver; and
a switch count variable for each of one or more transceivers of the node functioning as a precedence value for the transceiver for negotiating a home channel.

3. The first node of claim 2, operable to, in response to receiving the probe message from the second node, determine a number of shared transceivers between the first and second nodes, a shared transceiver between the first node and the second node comprising a transceiver of the first node and a transceiver of the second node that have the same transceiver number and the same home channel.

4. The first node of claim 3, operable to, if the number of shared transceivers between the first and second nodes is greater than zero, for each shared transceiver:
if the value of the switch count variable for that shared transceiver of the first node is less than the value of the switch count variable for that transceiver of the second node, set the value of the switch count variable for that transceiver of the first node to the value of the switch count variable for that transceiver of the second node; and
if the value of the switch count variable for that shared transceiver of the first node is greater than the value of the switch count variable for that transceiver of the second node, transmit a probe message if a probe message has not already been transmitted.

5. The first node of claim 3, operable to, if the number of shared transceivers between the first and second nodes is zero, negotiate a shared transceiver between the first and second nodes.

6. The first node of claim 3, operable to, if the number of shared transceivers between the first and second nodes is zero:
determine a number of candidate transceivers of the first node, each candidate transceiver comprising a transceiver of the first node that does not currently have the same home channel as its corresponding transceiver of the second node and that has a value for its switch count variable that is less than or equal to the value of the switch count variable for the corresponding transceiver of the second node; and
if the number of candidate transceivers of the first node is zero, transmit a probe message.

7. The first node of claim 3, operable to, if the number of shared transceivers between the first and second nodes is zero:
determine a number of candidate transceivers of the first node, each candidate transceiver comprising a transceiver of the first node that does not currently have the same home channel as its corresponding transceiver of the second node and that has a value for its switch count variable that is less than or equal to the value of the switch count variable for the corresponding transceiver of the second node; and
if the number of candidate transceivers of the first node is greater than zero:
select a candidate transceiver of the first node for a home channel change in order to establish a shared transceiver with the second node; and
change the home channel of the selected candidate transceiver of the first node to the home channel of the corresponding transceiver of the second node.

8. The first node of claim 7, operable to:
determine if the home channel to which the selected candidate transceiver was changed is already in use by another transceiver of the first node; and
if it is determined that the home channel to which the selected candidate transceiver was changed is already in use by another transceiver of the first node:
change the home channel of the selected transceiver of the first node to a home channel that is unused by another transceiver of the first node; and
set the value of the switch count variable for the selected candidate transceiver of the first node to one greater than the value of the switch count variable for the transceiver of the second node that corresponds to the selected candidate transceiver of the first node.

9. The first node of claim 8, further operable to communicate a probe message comprising:
an indication of the new home channel selected for the selected candidate transceiver of the first node; and
the new value of the switch count variable for the selected candidate transceiver of the first node.

10. The first node of claim 7, operable to:
determine if the home channel to which the selected candidate transceiver was changed is already in use by another transceiver of the first node; and
if it is determined that the home channel to which the selected candidate transceiver was changed is not already in use by another transceiver of the first node;
increment the value of the switch count variable for the selected candidate transceiver of the first node if it is determined that the value of the switch count variable for the selected candidate transceiver of the first node is equal to the value of the switch count variable for the transceiver of the second node that corresponds to the selected candidate transceiver of the first node; and
set the value of the switch count variable for the selected transceiver of the first node to the value of the switch count variable for the transceiver of the second node that corresponds to the selected transceiver of the first node if it is determined that the value of the switch count variable for the selected candidate transceiver of the first node is less than the value of the switch count variable for the transceiver of the second node that corresponds to the selected candidate transceiver of the first node.

11. The first node of claim 1, wherein if it is determined that the first node should not set a transceiver of the first node to the new channel, then one or more of the following is true;
the one or more transceivers of the first node remain on their respective home channels; and
the first node is further operable to transmit a probe message.

12. The first node of claim 1, further operable to, if the first node does not currently have a shared transceiver with one or more other nodes within a node group of the first node, spontaneously transmit, independent of receiving the probe message from the second node, one or more probe messages for purposes of forming or reforming a network.

13. The first node of claim 1, wherein one of the plurality of transceivers of the first node is dedicated to one or more of transmitting and receiving probe messages.

14. The first node of claim 1, wherein one or more of the plurality of transceivers of the first node each comprise a data transceiver operable to perform both data communications and transmission and receipt of probe messages.

15. The first node of claim 1, wherein the communication network comprises a wireless ad-hoc network, the first node comprising a channel-agile mobile terminal within the wireless ad-hoc network.

16. The first node of claim 1, wherein the communication network comprises a wireless infrastructure network, the first node comprising either a mobile station or a base station within the wireless infrastructure network.

17. A method performed at a first node among a plurality of nodes, the first node capable of forming or reforming a communication network between one or more of the plurality of distributed nodes, each node in the plurality of distributed nodes comprising one or more transceivers, comprising:
   storing values for one or more node variables for the first node;
   spontaneously and independent of a centralized controller associated with the network, transmitting a probe message for purposes of forming or reforming a network;
   receiving a probe message from a second node for purposes of forming or reforming a network, the probe message comprising values for one or more node variables for the second node;
   comparing the values for the one or more node variables for the first node to the values for the one or more node variables for the second node within the probe message received from the second node to determine, independent of a centralized controller associated with the network, whether the first node should set a home channel of one of a plurality of transceivers of the first node to a new channel; and
   if it is determined that the first node should set the home channel of one of its transceivers to the new channel:
      determining from the plurality of transceivers of the first node an appropriate transceiver the home channel of which to set to the new channel; and
      setting the home channel of the determined appropriate transceiver of the first node to the new channel.

18. The method of claim 17, wherein the one or more node variables for a node comprise:
   a home channel variable for each of one or more transceivers of the node identifying the home channel of that transceiver; and
   a switch count variable for each of one or more transceivers of the node functioning as a precedence value for the transceiver for negotiating a home channel.

19. The method of claim 18, comprising, in response to receiving the probe message from the second node, determining a number of shared transceivers between the first and second nodes, a shared transceiver between the first node and the second node comprising a transceiver of the first node and a transceiver of the second node that have the same transceiver number and the same home channel.

20. The method of claim 19, comprising, if the number of shared transceivers between the first and second nodes is greater than zero, for each shared transceiver:
   if the value of the switch count variable for that shared transceiver of the first node is less than the value of the switch count variable for that transceiver of the second node, setting the value of the switch count variable for that transceiver of the first node to the value of the switch count variable for that transceiver of the second node; and
   if the value of the switch count variable for that shared transceiver of the first node is greater than the value of the switch count variable for that transceiver of the second node, transmitting a probe message if a probe message has not already been transmitted.

21. The method of claim 19, comprising, if the number of shared transceivers between the first and second nodes is zero, negotiating a shared transceiver between the first and second nodes.

22. The method of claim 19, comprising, if the number of shared transceivers between the first and second nodes is zero:
   determining a number of candidate transceivers of the first node, each candidate transceiver comprising a transceiver of the first node that does not currently have the same home channel as its corresponding transceiver of the second node and that has a value for its switch count variable that is greater than or equal to the value of the switch count variable for the corresponding transceiver of the second node; and
   if the number of candidate transceivers of the first node is zero, transmitting a probe message.

23. The method of claim 19, comprising, if the number of shared transceivers between the first and second nodes is zero:
   determining a number of candidate transceivers of the first node, each candidate transceiver comprising a transceiver of the first node that does not currently have the same home channel as its corresponding transceiver of the second node and that has a value for its switch count variable that is greater than or equal to the value of the switch count variable for the corresponding transceiver of the second node; and
   if the number of candidate transceivers of the first node is greater than zero:
      selecting a candidate transceiver of the first node for a home channel change in order to establish a shared transceiver with the second node; and
      changing the home channel of the selected candidate transceiver of the first node to the home channel of the corresponding transceiver of the second node.

24. The method of claim 23, comprising:
   determining if the home channel to which the selected candidate transceiver was changed is already in use by another transceiver of the first node; and
   if it is determined that the home channel to which the selected candidate transceiver was changed is already in use by another transceiver of the first node:
      changing the home channel of the selected transceiver of the first node to a home channel that is unused by another transceiver of the first node; and
      setting the value of the switch count variable for the selected candidate transceiver of the first node to one greater than the value of the switch count variable for the transceiver of the second node that corresponds to the selected candidate transceiver of the first node.

25. The method of claim 24, further comprising communicating a probe message comprising:
   an indication of the new home channel selected for the selected candidate transceiver of the first node; and
   the new value of the switch count variable for the selected candidate transceiver of the first node.

26. The method of claim 23, comprising:
    determining if the home channel to which the selected candidate transceiver was changed is already in use by another transceiver of the first node; and
    if it is determined that the home channel to which the selected candidate transceiver was changed is not already in use by another transceiver of the first node:
        determining a relationship between the value of the switch count variable for the selected candidate transceiver of the first node and the value of the switch count variable for the transceiver of the second node that corresponds to the selected candidate transceiver of the first node;
        incrementing the value of the switch count variable for the selected candidate transceiver of the first node if it is determined that the value of the switch count variable for the selected candidate transceiver of the first node is equal to the value of the switch count variable for the transceiver of the second node that corresponds to the selected candidate transceiver of the first node; and
        setting the value of the switch count variable for the selected transceiver of the first node to the value of the switch count variable for the transceiver of the second node that corresponds to the selected transceiver of the first node if it is determined that the value of the switch count variable for the selected candidate transceiver of the first node is less than the value of the switch count variable for the transceiver of the second node that corresponds to the selected candidate transceiver of the first node.

27. The method of claim 17, wherein if one or more transceivers of the first node currently have a home channel and it is determined that the first node should not set a transceiver of the first node to the new channel, then one or more of the following is true:
    the one or more transceivers of the first node remain on their respective home channels; and
    the method further comprises transmitting a probe message.

28. The method of claim 17, further comprising, if the first node does not currently have a shared transceiver with one or more other nodes within a node group of the first node, spontaneously transmitting, independent of receiving the probe message from the second node, one or more probe messages for purposes of forming or reforming a network.

29. The method of claim 17, wherein one of the plurality of transceivers of the first node is dedicated to one or more of transmitting and receiving probe messages.

30. The method of claim 17, wherein one or more of the plurality of transceivers of the first node each comprise a data transceiver operable to perform both data communications and transmission and receipt of probe messages.

31. The method of claim 17, wherein the communication network comprises a wireless ad-hoc network, the first node comprising a channel-agile mobile terminal within the wireless ad-hoc network.

32. The method of claim 17, wherein the communication network comprises a wireless infrastructure network, the first node comprising either a mobile station or a base station within the wireless infrastructure network.

33. Software associated with a first node among a plurality of nodes, the first node capable of forming or reforming a communication network between one or more of the plurality of distributed nodes, each node in the plurality of distributed nodes comprising one or more transceivers, the software being embodied in computer-readable media and when executed operable to:
    store values for one or more node variables for the first node;
    spontaneously and independent of a centralized controller associated with the network, transmit a probe message for purposes of forming or reforming a network;
    receive a probe message from a second node for purposes of forming or reforming a network, the probe message comprising values for one or more node variables for the second node;
    compare the values for the one or more node variables for the first node to the values for the one or more node variables for the second node within the probe message received from the second node to determine, independent of a centralized controller associated with the network, whether the first node should set a home channel of one of a plurality of transceivers of the first node to a new channel; and
    if it is determined that the first node should set the home channel of one of its transceivers to the new channel:
        determine from the plurality of transceivers of the first node an appropriate transceiver the home channel of which to set to the new channel; and
        set the home channel of the determined appropriate transceiver of the first node to the new channel.

34. The software of claim 33, wherein the one or more node variables for a node comprise:
    a home channel variable for each of one or more transceivers of the node identifying the home channel of that transceiver; and
    a switch count variable for each of one or more transceivers of the node functioning as a precedence value for the transceiver for negotiating a home channel.

35. The software of claim 34, operable to receive the probe message from the second node, determining a number of shared transceivers between the first and second nodes, a shared transceiver between the first node and the second node comprising a transceiver of the first node and a transceiver of the second node that have the same transceiver number and the same home channel.

36. The software of claim 35, operable to, if the number of shared transceivers between the first and second nodes is greater than zero, for each shared transceiver:
    if the value of the switch count variable for that shared transceiver of the first node is less than the value of the switch count variable for that transceiver of the second node, set the value of the switch count variable for that transceiver of the first node to the value of the switch count variable for that transceiver of the second node; and
    if the value of the switch count variable for that shared transceiver of the first node is greater than the value of the switch count variable for that transceiver of the second node, transmit a probe message if a probe message has not already been transmitted.

37. The software of claim 35, operable to, if the number of shared transceivers between the first and second nodes is zero, negotiate a shared transceiver between the first and second nodes.

38. The software of claim 35, operable to, if the number of shared transceivers between the first and second nodes is zero:
    determine a number of candidate transceivers of the first node, each candidate transceiver comprising a transceiver of the first node that does not currently have the same home channel as its corresponding transceiver of the second node and that has a value for its switch count variable that is greater than or equal to the value of the switch count variable for the corresponding transceiver of the second node; and if the number of candidate transceivers of the first node is zero, transmit a probe message.

39. The software of claim 35, operable to, if the number of shared transceivers between the first and second nodes is zero:

determine a number of candidate transceivers of the first node, each candidate transceiver comprising a transceiver of the first node that does not currently have the same home channel as its corresponding transceiver of the second node and that has a value for its switch count variable that is greater than or equal to the value of the switch count variable for the corresponding transceiver of the second node; and if the number of candidate transceivers of the first node is greater than zero:

select a candidate transceiver of the first node for a home channel change in order to establish a shared transceiver with the second node; and change the home channel of the selected candidate transceiver of the first node to the home channel of the corresponding transceiver of the second node.

40. The software of claim 39, operable to:

determine if the home channel to which the selected candidate transceiver was changed is already in use by another transceiver of the first node; and if it is determined that the home channel to which the selected candidate transceiver was changed is already in use by another transceiver of the first node:

change the home channel of the selected transceiver of the first node to a home channel that is unused by another transceiver of the first node; and set the value of the switch count variable for the selected candidate transceiver of the first node to one greater than the value of the switch count variable for the transceiver of the second node that corresponds to the selected candidate transceiver of the first node.

41. The software of claim 40, further operable to communicate a probe message comprising:

an indication of the new home channel selected for the selected candidate transceiver of the first node; and the new value of the switch count variable for the selected candidate transceiver of the first node.

42. The software of claim 39, operable to:

determine if the home channel to which the selected candidate transceiver was changed is already in use by another transceiver of the first node; and if it is determined that the home channel to which the selected candidate transceiver was changed is not already in use by another transceiver of the first node:

determine a relationship between the value of the switch count variable for the selected candidate transceiver of the first node and the value of the switch count variable for the transceiver of the second node that corresponds to the selected candidate transceiver of the first node;

increment the value of the switch count variable for the selected candidate transceiver of the first node if it is determined that the value of the switch count variable for the selected candidate transceiver of the first node is equal to the value of the switch count variable for the transceiver of the second node that corresponds to the selected candidate transceiver of the first node; and set the value of the switch count variable for the selected transceiver of the first node to the value of the switch count variable for the transceiver of the second node that corresponds to the selected transceiver of the first node if it is determined that the value of the switch count variable for the selected candidate transceiver of the first node is less than the value of the switch count variable for the transceiver of the second node that corresponds to the selected candidate transceiver of the first node.

43. The software of claim 33, wherein, if one or more transceivers of the first node currently have a home channel and it is determined that the first node should not set a transceiver of the first node to the new channel, then one or more of the following is true:

the one or more transceivers of the first node remain on their respective home channels; and the software is further operable to transmit a probe message.

44. The software of claim 33, further operable to, if the first node does not currently have a shared transceiver with one or more other nodes within a node group of the first node, spontaneously transmit, independent of receiving the probe message from the second node, one or more probe messages for purposes of forming or reforming a network.

45. The software of claim 33, wherein one of the plurality of transceivers of the first node is dedicated to one or more of transmitting and receiving probe messages.

46. The software of claim 33, wherein one or more of the plurality of transceivers of the first node each comprise a data transceiver operable to perform both data communications and transmission and receipt of probe messages.

47. The software of claim 33, wherein the communication network comprises a wireless ad-hoc network, the first node comprising a channel-agile mobile terminal within the wireless ad-hoc network.

48. The software of claim 33, wherein the communication network comprises a wireless infrastructure network, the first node comprising either a mobile station or a base station within the wireless infrastructure network.

* * * * *